(12) United States Patent
Reynolds et al.

(10) Patent No.: US 10,168,711 B2
(45) Date of Patent: Jan. 1, 2019

(54) METHOD AND APPARATUS FOR AUTONOMOUS CONVEYANCE OF TRANSPORT CARTS

(71) Applicant: Omron Adept Technologies, Inc., San Ramon, CA (US)

(72) Inventors: Todd P. Reynolds, Merrimack, NH (US); Deron Jackson, San Jose, CA (US); Matthew LaFary, Livermore, CA (US); Justin Eskesen, Alameda, CA (US)

(73) Assignee: Omron Adept Technologies, Inc., San Ramon, CA (US)

( * ) Notice: Subject to any disclaimer, the term of this patent is extended or adjusted under 35 U.S.C. 154(b) by 190 days.

(21) Appl. No.: 15/265,033

(22) Filed: Sep. 14, 2016

(65) Prior Publication Data
US 2017/0072558 A1    Mar. 16, 2017

Related U.S. Application Data

(60) Provisional application No. 62/219,236, filed on Sep. 16, 2015.

(51) Int. Cl.
*G05D 1/02*    (2006.01)

(52) U.S. Cl.
CPC ........... *G05D 1/0246* (2013.01); *G05D 1/024* (2013.01); *G05D 2201/0216* (2013.01); *Y10S 901/01* (2013.01); *Y10S 901/46* (2013.01)

(58) Field of Classification Search
CPC ................. G05D 1/0246; G05D 1/024; G05D 2201/0216; Y10S 901/01; Y10S 901/46
See application file for complete search history.

(56) References Cited

U.S. PATENT DOCUMENTS

| | | | |
|---|---|---|---|
| 6,895,301 B2 | 5/2005 | Mountz | |
| 6,950,722 B2 | 9/2005 | Mountz | |
| 8,239,291 B2 | 8/2012 | Hoffman et al. | |
| 8,688,275 B1 | 4/2014 | Lafary et al. | |
| 9,090,400 B2 | 7/2015 | Wurman et al. | |
| 2004/0015266 A1* | 1/2004 | Skoog | B25J 5/007 700/245 |
| 2004/0093650 A1* | 5/2004 | Martins | B25J 5/007 180/167 |

(Continued)

*Primary Examiner* — Rodney A Butler
(74) *Attorney, Agent, or Firm* — Murphy, Bilak & Homiller, PLLC

(57) ABSTRACT

In one aspect of the teachings presented herein, an autonomously-navigating mobile robot moves to a designated location and detects the presence and relative positioning of a compatible wheeled cart, based on recognizing one or more characteristic physical features of the cart from sensor readings taken by the robot. The robot moves into a position of gross alignment with the cart, based on the detected relative position of the cart, which means that the robot accommodates carts that are not properly positioned or oriented for pickup. The robot takes additional sensor readings referenced to the same or additional characteristic features of the cart and moves into a position of fine alignment with the cart, whereupon it latches to the cart and transports it via rolling conveyance to a designated destination location. The cart preferably includes a normally-on brake that is automatically disengaged by virtue of the robot latching to it.

28 Claims, 14 Drawing Sheets

(56) References Cited

U.S. PATENT DOCUMENTS

| | | | | |
|---|---|---|---|---|
| 2005/0029029 A1* | 2/2005 | Thorne | ............... | G05D 1/0242 180/167 |
| 2010/0268382 A1* | 10/2010 | Ohno | ................... | G05D 1/0246 700/245 |
| 2012/0152877 A1* | 6/2012 | Tadayon | .................... | B25J 5/02 212/224 |
| 2012/0193154 A1* | 8/2012 | Wellborn | .............. | B62D 59/04 180/14.2 |
| 2014/0350725 A1 | 11/2014 | Lafary et al. | | |
| 2014/0365258 A1 | 12/2014 | Vestal et al. | | |
| 2015/0234386 A1* | 8/2015 | Zini | .................... | G05D 1/0274 701/26 |

* cited by examiner

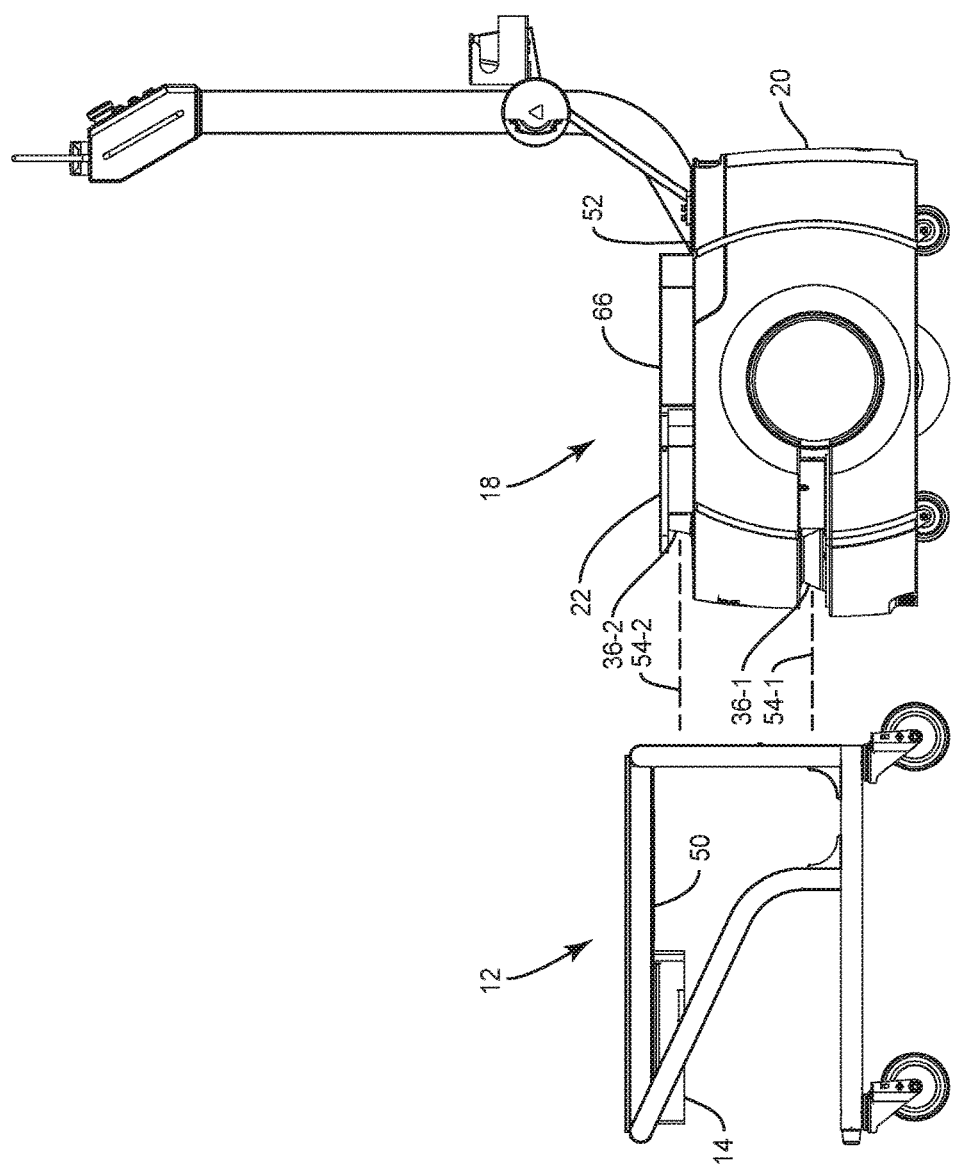

METHOD AND APPARATUS FOR AUTONOMOUS CONVEYANCE OF TRANSPORT CARTS

RELATED APPLICATIONS

This application claims priority from the U.S. provisional application filed on 2015 Sep. 16 and assigned App. No. 62/219,236, which application is incorporated herein by reference.

TECHNICAL FIELD

The present invention relates to transport carts, and particularly relates to the autonomous conveyance of transport carts.

BACKGROUND

In some order processing, manufacturing and production facilities, goods and materials are moved from one location to another location in rolling carts, baskets or bins. Sometimes these rolling carts, baskets or bins are pushed, pulled or carried by humans. In the more advanced, automated facilities, the rolling carts, baskets or bins may be carried, pushed or pulled by autonomously-navigating mobile robots, which offer considerable advantages and benefits over using human beings to perform the same tasks.

U.S. Publication No. 2014-0350725 by LaFary et al. discloses an autonomous mobile robot for handling job assignments in a physical environment inhabited by stationary and non-stationary obstacles. The autonomous mobile robot comprises a robot base controller and an onboard navigation system that, in response to receiving a job assignment specifying a job location that is associated with one or more job operations, activates the onboard navigation system to automatically determine a path that the mobile robot should use to drive to the specified job location. If the mobile robot determines that using an initially-selected path could cause the mobile robot to run into a stationary or non-stationary obstacle in the physical environment, such as a closed door, a person or another mobile robot, then the onboard navigation system of the mobile robot automatically determines a new path to use that avoids the stationary and non-stationary obstacles, and automatically drives the mobile robot to the job location using the new path, thereby avoiding contact or collisions with those obstacles. After the mobile robot arrives at the job location, it automatically performs the job operations associated with that job location.

U.S. Publication No. 2014-0365258 by Vestal et al. discloses a job management system for a fleet of autonomously-navigating mobile robots operating in an automated physical environment, such as a factory, hospital, order processing facility or office building. The job management system includes a map defining a floor plan, a set of virtual job locations and a set of one or more virtual job operations associated with virtual job locations. The job management system automatically determines the actual locations and actual job operations for the job requests, and intelligently selects a suitable mobile robot from the fleet of mobile robots to handle each job request based on the current status and/or the current physical configuration and capabilities of the selected mobile robot. The job management system also sends commands to the selected mobile robot that cause the selected mobile robot to automatically drive to the actual job location, and/or perform the actual job operations.

U.S. Pat. No. 8,688,275 to LaFary et al. discloses methods and systems for ensuring that autonomously-navigating mobile robots are able to detect and avoid positive obstacles in a physical environment, such as objects suspended from a ceiling or other structure, long table tops with legs at the ends (and no legs in the middle), and obstacles that stick out from the edge of other objects, like keyboard trays, which are typically hard for mobile robots to detect due to their relatively unusual placement and orientation in the physical world. U.S. Pat. No. 8,688,275 also discloses systems and methods that enable autonomously-navigating mobile robots to detect and avoid driving into negative obstacles (i.e., voids in the physical environment), such as gaps or holes in the floor, a cliff or ledge, or a descending flight of stairs.

But the advantages and benefits of using autonomously-navigating robots for transporting rolling carts, baskets and bins around an order processing warehouse, a production facility, an office building, or any other type of facility, have heretofore been significantly limited due to the inability of conventional autonomously-navigating mobile robots to reliably and consistently carry out, without human supervision or assistance, certain operations necessarily associated with transporting carts, baskets or bins around a facility. These necessary operations include, for example: (1) locating and identifying a specific cart, basket or bin specified for a job request; (2) automatically engaging with the specified cart, basket or bin to pick it up and secure it to the mobile robot prior to transporting it to a new location; and (3) automatically releasing the rolling cart, bin or basket from the mobile robot to drop it off at a specified destination, without the release/drop off operation changing the desired resting location and/or orientation of the rolling cart, bin or basket at the specified destination.

SUMMARY

In one aspect of the teachings presented herein, an autonomously-navigating mobile robot moves to a designated location and detects the presence and relative positioning of a compatible wheeled cart, based on recognizing one or more characteristic physical features of the cart from sensor readings taken by the robot. The robot moves into a position of gross alignment with the cart, based on the detected relative position of the cart, which means that the robot accommodates carts that are not properly positioned or oriented for pickup. The robot takes additional sensor readings referenced to the same or additional characteristic features of the cart and moves into a position of fine alignment with the cart, whereupon it latches to the cart and transports it via rolling conveyance to a designated destination location. The cart preferably includes a normally-on brake that is automatically disengaged by virtue of the robot latching to it.

An example method performed by an autonomously-navigating mobile robot includes a number of steps or "phases" that are carried out in association with moving a wheeled cart from one designated location to another. The method includes performing a cart-finding operation upon arrival at a specified first location, where the cart-finding operation comprises acquiring first object detection data and determining whether a first physical feature of a wheeled cart is recognized in the first object detection data. The method further includes performing a gross positioning operation upon recognizing the first physical feature.

The gross positioning operation comprising maneuvering the robot into a gross alignment position computed with reference to the first physical feature of the cart. Still further, the method includes performing a fine-alignment operation subsequent to performing the gross positioning operation. The fine-alignment operation comprises acquiring second object detection data, recognizing the first or a second physical feature of the cart in the second object detection data, and maneuvering the robot into a fine-alignment position computed with reference to the first or second physical feature.

As a further step or phase of the example method, the robot performs a cart-latching operation upon moving into the fine-alignment position. The cart-latching operation comprises activating a motorized latch at the fine-alignment position, to hook to the cart and exert a pulling force on the cart that draws a mating feature of the robot into engagement with a mating feature of the cart. By way of example, drawing the complementary mating features of the robot and cart into engagement means bringing the complementary mating features of the robot and cart into physical, possibly interlocking contact, or at least exerting a biasing force to promote or retain engagement between the robot and cart mating features.

In a further example, an autonomously-navigating mobile robot performs a method that may be subsumed in the preceding method, or implemented as an alternative embodiment. The method includes moving to a specified first location having a wheeled cart parked proximate to the first location. The method further includes detecting, via first sensor data acquired by the robot after moving to the first location, a first physical feature of the cart and determining relative distances and angles for the first physical feature from the first sensor data. Operations continue with the robot maneuvering into a gross alignment position with respect to the cart, based on the relative distances and angles determined for the first physical feature from the first sensor data.

Still further, the method includes the robot detecting, via second sensor data acquired by the robot after moving to the gross alignment position, the first physical feature or a second physical feature of the cart and determining relative distances and angles for the first or second physical feature from the second sensor data, and maneuvering the robot into a fine-alignment position with respect to the cart, based on the relative distances and angles determined for the first or second physical feature from the second sensor data. Operations continue with the robot latching to the cart after reaching the fine-alignment position, moving to a specified second location with the cart latched to the robot in rolling engagement, and unlatching and disengaging from the cart at the specified second location.

In another example embodiment, an autonomously-navigating mobile robot comprises a wheeled housing assembly, a drive system, one or more sensors, and a control system with associated interface circuitry. The wheeled housing assembly includes or has mounted thereon a mating feature configured for engaging with a complementary mating feature of a wheeled cart, and the drive system comprises one or more motors and steering actuators configured to provide drive and steering control for the robot.

The one or more sensors are configured to provide sensor data for the surrounding physical environment of the robot. For example, the one or more sensors provide object detection data that allow the robot to detect objects within the surrounding physical environment, at least within the detection range and resolution limitations of the involved sensor or sensors.

The control system is operatively associated with the drive system and the one or more sensors and is configured to move the robot to a specified first location, an example of the aforementioned cart being parked proximate to the first location. Moving the robot comprises, for example, controlling one or more motors and/or steering actuators.

The control system is configured to detect, via first sensor data acquired by the robot after moving to the first location, a first physical feature of the cart and determine relative distances and angles for the first physical feature from the first sensor data. Correspondingly, the control system is configured to maneuver the robot into a gross alignment position with respect to the cart, based on the relative distances and angles determined for the first physical feature from the first sensor data.

Still further, the control system is configured to detect, via second sensor data acquired by the robot after moving to the gross alignment position, the first physical feature or a second physical feature of the cart and determine relative distances and angles for the first or second physical feature from the second sensor data. The control system is further configured to maneuver the robot into a fine-alignment position with respect to the cart, based on the relative distances and angles determined for the first or second physical feature from the second sensor data, latch to the cart after reaching the fine-alignment position, and move to a specified second location with the cart latched to the robot in rolling engagement. Correspondingly, the control system is configured to unlatch and disengage from the cart at the specified second location.

In a related or further example, an autonomously-navigating mobile robot performs a method that includes moving to a specified first location and coupling to a wheeled cart that is parked at or proximate to the first location. Coupling to the cart is based on detecting, from sensor data, a mating feature of the cart, and advancing toward the cart along a trajectory calculated from the sensor data to bring a complementary mating feature of the robot into engagement with the mating feature of the cart.

The method further includes detecting that the complementary mating feature of the robot has moved into fine alignment with the mating feature of the cart, and, responsive to detecting the fine alignment, terminating the advance and triggering a motorized latch that exerts a pulling force on the cart towards the robot. The pulling force urges the mating feature of the cart into engagement with the complementary mating feature of the robot, and the method continues with the robot rolling the cart to a specified second location and correspondingly uncoupling from the cart by releasing the motorized latch and reversing away from the cart.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIG. 5 is a side view of one embodiment of a mobile robot and a wheeled cart.

DETAILED DESCRIPTION

Reference will now be made in detail to the preferred embodiments of the invention, examples of which are illustrated in the accompanying drawings. Notably, the present invention may be implemented using software, hardware, or any combination thereof, as would be apparent to those of skill in the art, and the figures and examples below are not meant to limit the scope of the present invention or its embodiments or equivalents.

Figure 1:
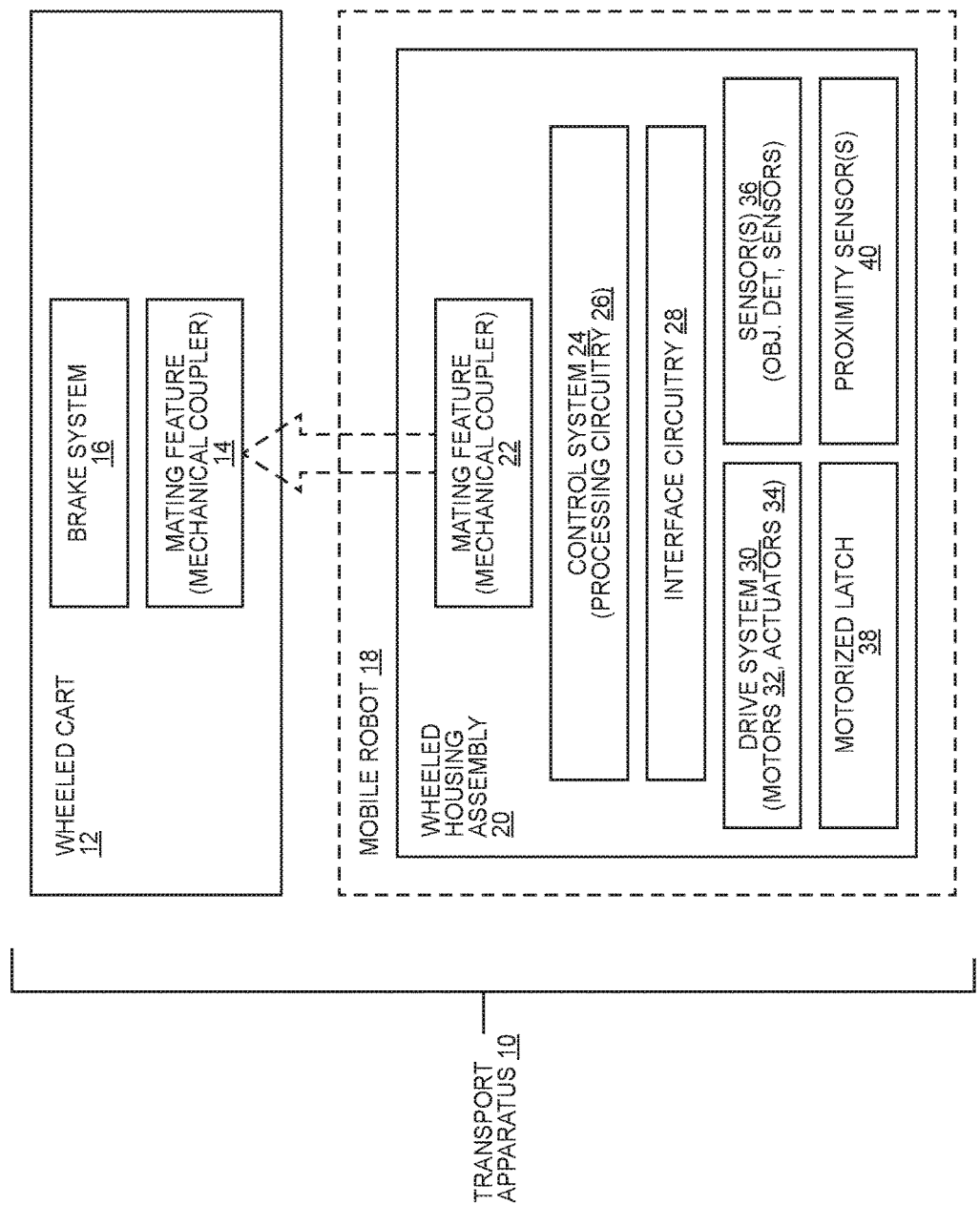
FIG. 1 is a block diagram of one embodiment of a transport apparatus or system that includes an autonomously-navigating mobile robot and a compatible wheeled cart.

FIG. 1 illustrates one embodiment of a transport apparatus 10, which may also be referred to as a transport system. The apparatus 10 includes a wheeled cart 12, also referred to as a rolling cart. Among other notable components or assemblies, the cart 12 includes a mating feature 14, which may comprise a mechanical coupler, such as a mating receptacle. The cart 12 further includes a brake system 16 that is configured to prevent the cart 12 from rolling whenever the cart 12 is not being transported by an autonomously-navigating mobile robot 18 that is included in the overall apparatus or system 10. In that sense, it will be understood that the apparatus 10 comprises an aggregation of the cart 12 and robot 18 as two separate, but complementary and compatible entities. More generally, there may be any number of like carts 12 and like robots 18.

Among other components or assemblies, the robot 18 includes a wheeled housing assembly 20 that includes or has mounted thereon a mating feature 22 configured for engaging with a complementary mating feature 14 of a cart 12, a drive system 30 comprising one or more motors 32 and steering actuators 34 configured to provide drive and steering control for the robot 18, and one or more sensors 36 configured to provide sensor data for the surrounding physical environment of the robot 18. The robot 18 further includes a control system 24 and associated interface circuitry 28 operatively associated with the drive system 30 and the one or more sensors 36.

The control system 24 is configured to move the robot 18 to a specified first location, the cart 12 being parked proximate to the first location, detect, via first sensor data acquired by the robot after moving to the first location, a first physical feature of the cart 12 and determine relative distances and angles for the first physical feature from the first sensor data. The control system 24 is further configured to maneuver the robot 18 into a gross alignment position with respect to the cart 12, based on the relative distances and angles determined for the first physical feature from the first sensor data.

Still further, the control system 24 is configured to detect, via second sensor data acquired by the robot after moving to the gross alignment position, the first physical feature or a second physical feature of the cart, determine relative distances and angles for the first or second physical feature from the second sensor data, and maneuver the robot into a fine-alignment position with respect to the cart 12, based on the relative distances and angles determined for the first or second physical feature from the second sensor data. The control system 24 is also configured to latch the robot to the cart 12 after the robot 18 reaches the fine-alignment position, move the robot 18 to a specified second location with the cart 12 latched to the robot 18 in rolling engagement, and unlatch and disengage the robot 18 from the cart 12 at the specified second location.

Here, it will be understood that the control system 24 "moves" the robot 18 based on controlling the drive system 30, latches the robot 18 to the cart 12 via a motorized latch 38 included in the robot 18, and acquires the first and second sensor data from the one or more sensors 36. In this regards, "acquiring" the first and second sensor data from the one or more sensors 36 may comprise acquiring raw sensor data or signals and using the raw data or signals directly, or may comprise processing raw sensor data or signals and deriving, based on such processing, the first and second sensor data.

The control system 24 comprises, for example, processing circuitry 26 comprising programmed circuitry or fixed circuitry, or any combination of fixed and programmed circuitry. In an example embodiment, the processing circuitry 26 comprises one or more microprocessors. Digital Signal Processors (DSPs), Field Programmable Gate Arrays (FPGAs), or Application Specific Integrated Circuits (ASICs), or any mix thereof. At least a portion of such circuitry is obtained or realized based on one or more processors executing computer program instructions stored in a computer-readable medium (or media) included in the robot 18. For example, the processing circuitry 26 includes working and program memory used to store a computer program or programs for execution by one or more processors.

The interface circuitry 28 provides the control system 24 with monitoring and control access to various other components of the robot 18. The interface circuitry 28 comprises, for example, discrete analog and/or digital I/O, and may include one or more data and control bus interfaces, signal isolation or level-shifting circuits, transducer circuits, and other such circuitry as is known for providing computer-based control of electromechanical systems that include motors, sensors, etc.

Regardless of the circuit-implementation details adopted for the control system 24, in at least some embodiments, the control system 24 is configured to maneuver the robot 18 into the gross alignment position by moving and steering the robot 18 to compensate for an initial misalignment between the cart 12 and the robot 18, as calculated from the relative distances and angles determined for the first physical feature from the first sensor data. In the same embodiments, or in further embodiments, the control system 24 is configured to maneuver into the fine-alignment position by advancing the robot 18 toward the cart 12 from the gross alignment position via dead reckoning, according to the relative distances and angles determined for the first or second physical feature from the second sensor data.

In some embodiments, the one or more sensors 36 comprise first and second object detection sensors and the control system 24 is configured to acquire the first and second sensor data from the first and second object detection sensors, respectively. A first laser scanner serves as the first object detection sensor, for example, while a second laser scanner serves as the second object detection sensor. Other sensor implementations are contemplated, of course, such as by equipping the robot 18 with one or more cameras—e.g., stereoscopic cameras—such that the first and second sensor data comprises image data or "depth maps" derived from the image data.

As an example, the first physical feature of the cart 12 has a first geometry known to the control system 24 and the control system is configured to detect the first physical feature via the first sensor data by determining that a portion of the first sensor data is characteristic of the first geometry. Similarly, the second physical feature of the cart 12 has a second geometry known to the control system 24 and the control system 24 is configured to detect the second physical feature via the second sensor data, based on determining that a portion of the second sensor data is characteristic of the second geometry. Sensor data is "characteristic" of a physical feature based on, for example, exhibiting a pattern of object detection values that are consistent with the known geometry.

The first sensor data comprises, for example, first object detection data comprising a first plurality of points having associated distances and angles. Correspondingly, the control system 24 is configured to detect that the portion of the first sensor data is characteristic of the first physical feature by determining that one or more clusters of points in the first plurality of points are consistent with the first geometry and with associated size information known for the first physical feature. Similarly, the second sensor data comprises second object detection data comprising a second plurality of points having associated distances and angles, and the control system 24 is configured to detect that the portion of the second sensor data is characteristic of the second physical feature by determining that one or more clusters of points in the second plurality of points are consistent with the second geometry and with associated size information known for the second physical feature.

At least some embodiments of the robot 18 advantageously recognize the mating feature 14 of the cart 12 as the "second physical feature." In such embodiments, the control system 24 is configured to maneuver the robot 18 into the fine-alignment position with respect to the cart 12 by determining a center point of the complementary mating feature 14 of the cart 12 and moving the robot 18 so as to bring the mating feature 22 of the robot 18 into centered engagement with the complementary mating feature 14 of the cart 12. In one or more such embodiments, the mating feature 14 of the cart 12 is a V-shaped receptacle, and the control system 24 is configured to determine the center point of the mating feature 14 of the cart 12 by the vertex of the V-shaped receptacle. The determination is based on the control system 24 detecting, from the second sensor data, line lengths and angles corresponding to sidewalls of the V-shaped receptacle.

Thus, in at least some embodiments, the control system 24 is configured to reference a first physical feature of the cart 12 for moving the robot 18 into the gross alignment position and reference a second physical feature of the cart 12 for moving the robot 18 from the gross alignment position and into the fine-alignment position. In at least one such embodiment, the second physical feature is the mating feature 14 of the cart 12. Detecting and aligning with the mating feature 14 of the cart 12 inherently aligns the mating feature 22 of the robot 18 with the mating feature 14 of the cart 12.

In an advantageous configuration, the first physical feature of the cart 12, which is detected by the robot 18 for gross positioning relative to the cart 12, comprises a pair or set of distinctive physical elements that have sizes, shapes, and spatial arrangements that are known to the robot 18. The physical elements may or may not be structural elements of the cart 12, e.g., they may be an inherent or integral part of the cart 12, or they may be added specifically for the purpose of making the cart 12 recognizable to the robot 18.

Further, there may be defined spatial arrangement between the first and second physical features of the cart 12. In at least one embodiment, the control system 24 is configured to detect the second physical feature in dependence on its detection of the first physical features. In particular, the control system 24 detects the second physical feature via the second sensor data by determining, based on the detection of the first physical feature and a known spatial relationship between the first and second physical features, a location where the second physical feature is expected to be detected, and determining that the portion of the second sensor data corresponding to the expected location is characteristic of the second physical feature.

Here, the corresponding "portion" of the second sensor data shall be understood as the data points or values corresponding to the angles, distances, directions, etc., that are expected for the second physical feature in relation to the detected location(s) of the first physical feature. It should also be appreciated that, when discussing the "location" of robot 18 or the cart 12, the word means the particular place or position of the robot 18 or cart 12, such as the location of the robot 18 or cart 12 within a warehouse or factory. However, when discussing the "location" of the first or second physical feature, the word refers to the placement or position of the feature on the cart 12. It should also be appreciated that the first and second sensor data may comprise or be associated with coordinate information, such as pixel row/column and distance information for a camera image, or such as scan angle and distance information for points obtained via laser scanning. Thus, the robot 18 may determine an "expected" location for the second physical feature of the cart 12 using sensor coordinates. Of course, the robot 18 may use multiple coordinate systems, such as world coordinates referenced to its physical space and may use coordinate transformations as needed, to relate sensor data to the physical environment.

With the above possibilities in mind for gross alignment and preparation for fine alignment, the control system 24 in one or more embodiments is configured to maneuver the robot 18 into the fine-alignment position with respect to the cart 12 by advancing the robot 18 toward the cart 12 from the gross alignment position. In one or more embodiments, the advancement is based on a distance computed as a function of the relative distances determined for the second physical feature, and is terminated in responsive to a proximity sensor 40 associated with the mating feature 22 of the robot 18 being triggered by a sensor actuator associated with the complementary mating feature 14 of the cart 12 (not shown in FIG. 1).

The control system 24 in one or more embodiments is configured to latch to the cart after reaching the fine-alignment position by activating a motorized latch 38 of the robot 18 responsive to the proximity sensor 40 being triggered. The motorized latch is configured to releasably hook to the cart 12 and exert a pulling force on the cart 12 that retains the mating feature 14 of the cart 12 in engagement with the complementary mating feature 22 of the robot 18.

In a non-limiting example, the control system 24 determines its distance from the cart 12 and computes the fine alignment position based on that distance. For example, the robot 18 and cart 12 may be designed such that at least a portion of the robot 18 is designed to move under the cart—e.g., between the cart legs—and the control system 24 may compute the fine alignment position based on determining the distance it should advance towards the cart 12 to move under it. The mating features 14 and 22 and cart 12 and robot 18 may be positioned such that the robot 18 driving under the cart 12 brings the mating feature 22 of the robot 18 into engagement, at least partially, with the mating feature 14 of the cart 12.

As a further advantage, the proximity sensor 40 may be mounted on the robot 18 and the corresponding sensor actuator (not shown) may be mounted on the cart 12 such that actuation of proximity sensor 40 by the sensor actuator can be taken as an indication that the robot 18 has achieved the fine alignment position. The control system 24 can, therefore, use the proximity sensor actuation as a trigger for activating the motorized latch 38, to exert a pulling force on the cart 12 towards the robot 18 and thereby urge or bias the cart 12 into engagement with the robot 18.

That is, in one or more embodiments, the control system 24 is configured to latch the robot 18 to the cart 12 after the robot 18 reaches the fine-alignment position, based on exerting a pulling force on the cart 12 via the motorized latch 38 of the robot 18. In at least one such embodiment, the pulling force urges the mating feature 22 of the robot 18 into engagement with the complementary mating feature 14 of the cart 12 and thereby actuates a brake release mechanism of the cart 12.

Figure 2:
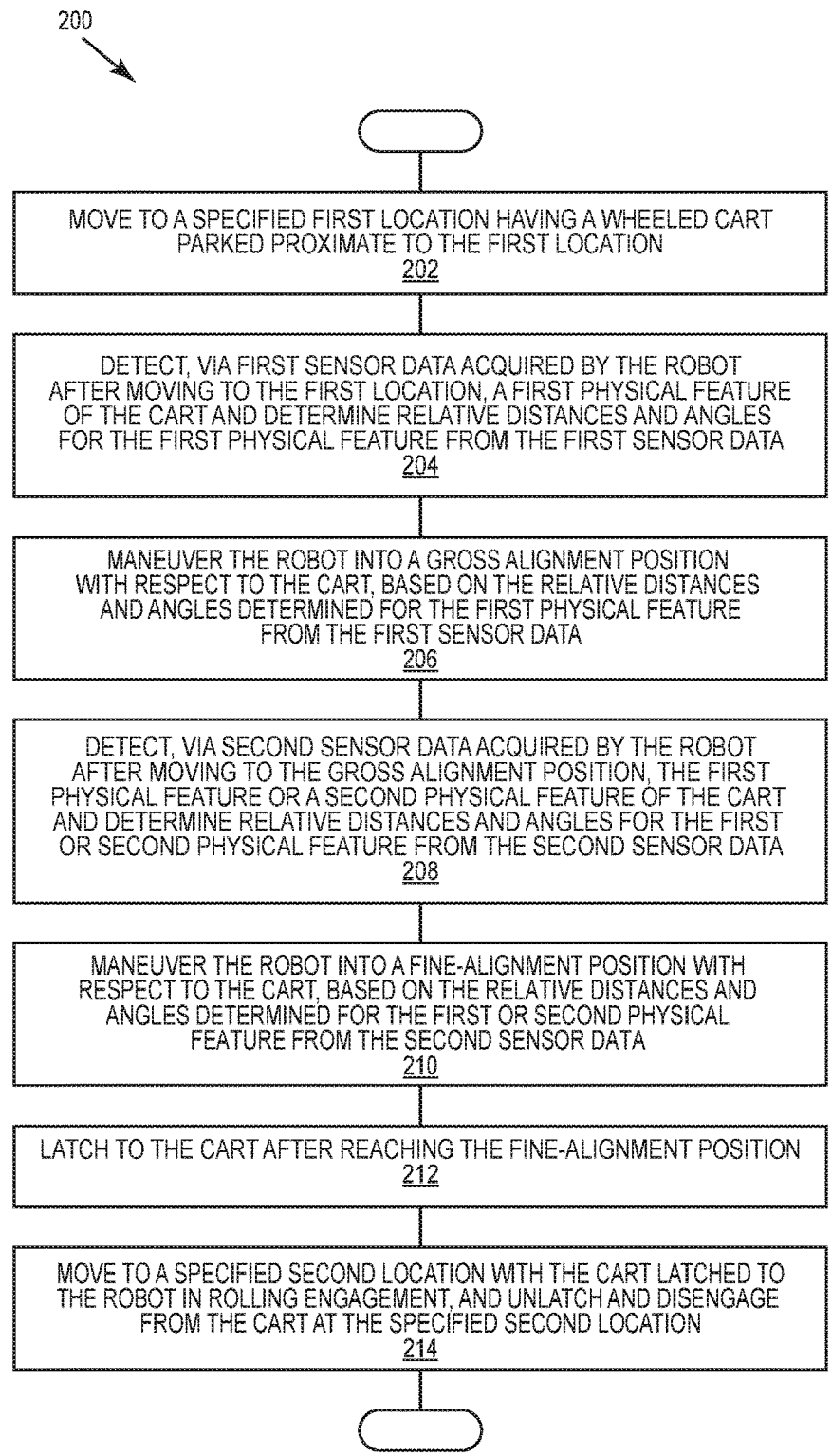
FIG. 2 is a logic flow diagram of one embodiment of a method of coupling to and conveying a wheeled cart, as carried out by a mobile robot.

FIG. 2 illustrates an example method 200 that is performed by an autonomously-navigating mobile robot, such as the robot 18. One or more steps or operations of the method 200 may be performed in an order other than that suggested by the diagram, and the method 200 may be triggered by the robot 18 being tasked with transporting a cart 12 from a specified first location to a specified second location. The first and second locations are defined, for example, by "map" coordinates provided to the robot 18 by a control system, which may be remote from the robot 18. Correspondingly, the robot 18 may store all or part of the map, such that it can compute paths for moving from its current location to the first location and moving from the first location to the second location.

In any case, the method 200 includes the robot 18 moving (Block 202) to a specified first location having a cart 12 parked proximate to the first location, detecting (Block 204), via first sensor data acquired by the robot 18 after moving to the first location, a first physical feature of the cart 12 and determining relative distances and angles for the first physical feature from the first sensor data. The method 200 further includes maneuvering (Block 206) the robot 18 into a gross alignment position with respect to the cart 12, based on the relative distances and angles determined for the first physical feature from the first sensor data.

Still further, the method 200 includes detecting (Block 208), via second sensor data acquired by the robot 18 after moving to the gross alignment position, the first physical feature or a second physical feature of the cart 12 and determining relative distances and angles for the first or second physical feature from the second sensor data. The method 200 continues with maneuvering (Block 210) the robot 18 into a fine-alignment position with respect to the cart 12, based on the relative distances and angles determined for the first or second physical feature from the second sensor data. Additionally, the method 200 includes latching (Block 212) to the cart 12 after reaching the fine-alignment position, and moving to a specified second location with the cart 12 latched to the robot 18 in rolling engagement, and unlatching and disengaging from the cart 12 at the specified second location (Block 214).

Figure 3:
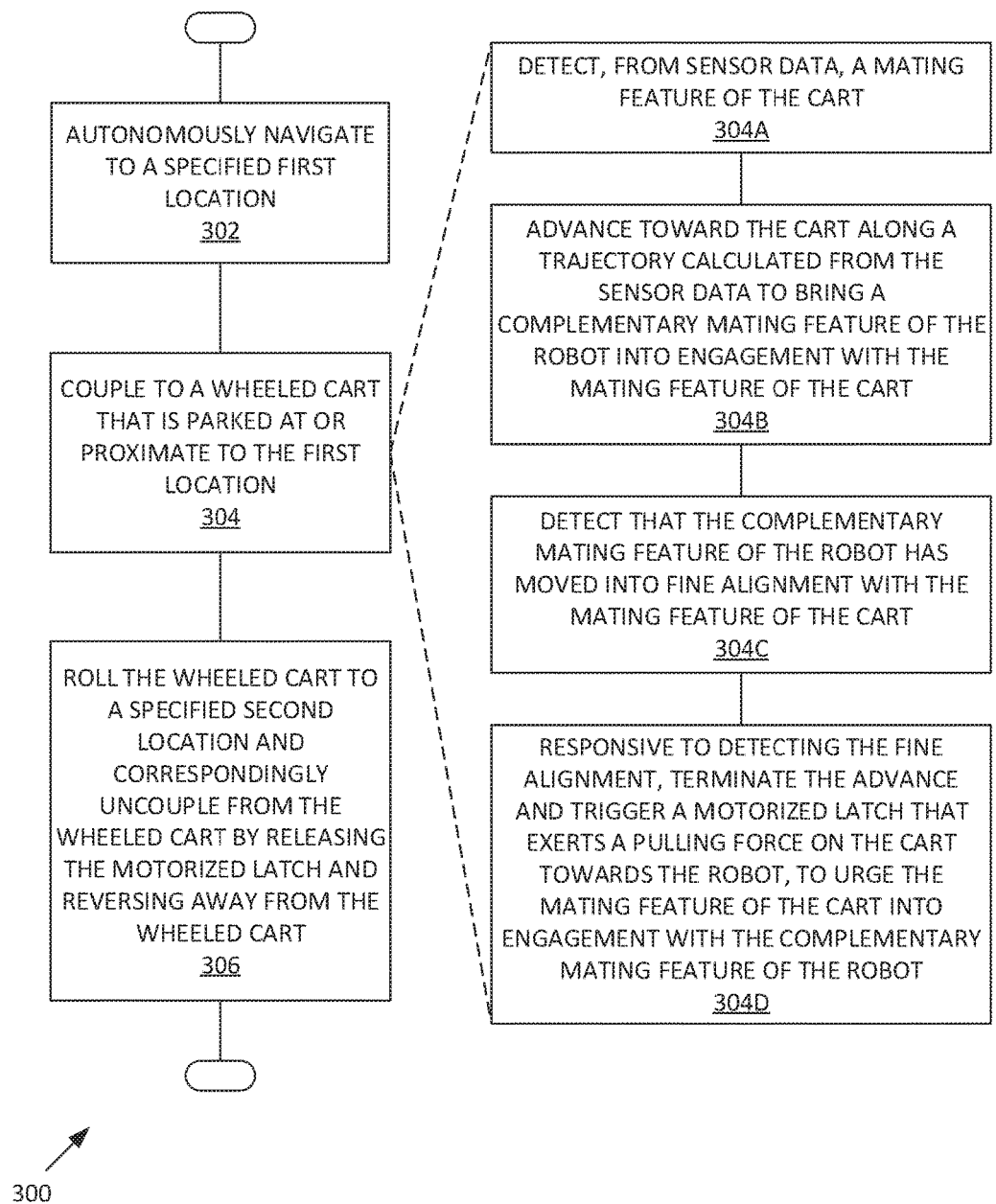
FIG. 3 is a logic flow diagram of another embodiment of a method of coupling to and conveying a wheeled cart, as carried out by a mobile robot.

FIG. 3 illustrates an example method 300 performed by an autonomously-navigating mobile robot, such as the robot 18. In one example, the method 300 is performed as part of the method 200, but it is not limited to such implementations. The method 300 includes the robot 18 moving (Block 302) to a specified first location, and coupling (Block 304) to a cart 12 that is parked at or proximate to the first location.

The coupling operation is based on the robot 18 detecting (Block 304A), from sensor data, a mating feature of the cart 12, advancing (Block 304B) toward the cart 12 along a trajectory calculated from the sensor data to bring a complementary mating feature 22 of the robot 18 into engagement with the mating feature 14 of the cart 12, and detecting (Block 304C) that the complementary mating feature 22 of the robot 18 has moved into fine alignment with the mating feature 14 of the cart 12. This detection comprises, for example, advancing the robot 18 to a fine-alignment position and detecting actuation of the proximity sensor 40 of the robot 18.

The method 300 further includes, responsive to detecting the fine alignment, terminating (Block 304D) the advance and trigger a motorized latch 38 that exerts a pulling force on the cart 12 towards the robot 18, to urge the mating feature 14 of the cart 12 into engagement with the complementary mating feature 22 of the robot 18. Here, the method 300 may also include stopping a motor that drives the motorized latch 38, in response to the motor reaching a preset torque threshold corresponding to a desired pulling force. Regardless, the method 300 continues with the robot 18 rolling the cart 12 to a specified second location and correspondingly uncoupling from the cart 12 by releasing the motorized latch 38 and reversing away from the cart 12 (Block 306).

In an example configuration, the sensor data comprises object detection data, and detecting (Block 304A) the mating feature 14 of the cart 12 comprises recognizing that a size and shape of a detected object in the object detection data matches a known size and shape of the mating feature 14 of the cart 12, and verifying that the detected object is at a location expected for the mating feature 14 of the cart 12. For example, the robot 18 may determine whether an object that otherwise matches the mating feature characteristics—e.g., size, shape—is detected at a horizontal center of the cart.

In at least one embodiment, detecting (Block 304A) the mating feature 14 comprises initially detecting one or more reference features of the cart 12, based on recognizing a first object-detection pattern in first sensor data initially acquired by the robot 18 upon arrival at the first location. The robot 18 uses a known spatial relationship between the one or more reference features of the cart 12 and the mating feature 14 of the cart 12, to look for the presence of a second object-detection pattern in second sensor data acquired by the robot 18, after using the first sensor data to move into gross alignment with the cart 12. The first object-detection pattern is characteristic of a physical size and spatial arrangement of the one or more reference features of the cart 12 and the second object-detection pattern is characteristic of a physical size and spatial arrangement of the mating feature 14.

The first sensor data comprises, for example, first scan data obtained on a scanning plane having an elevation intersecting with the one or more reference features of the cart 12, and the second sensor data comprises second scan data obtained on a scanning plane having an elevation intersecting with the mating feature 14.

As for advancing toward the cart 12 along the trajectory calculated from the sensor data to bring the mating feature 22 of the robot 18 into centered engagement with the mating feature 14 of the cart 12, in one or more embodiments, the robot 18 steers as the robot 18 moves towards the cart so as to minimize misalignment relative to a reference point of the mating feature 14 of the cart 12, as detected from the sensor data acquired by the robot 18.

As for coupling to the cart 12, in one or more embodiments, coupling to the cart 12 includes releasing a wheel brake of the cart 12 in conjunction with coupling to the cart 12, to thereby enable rolling conveyance of the cart 12 by the robot 18. For example, releasing the wheel brake comprises mechanically actuating a brake release mechanism of the cart 12 with the mating feature 22 of the robot 18, based on drawing the cart 12 toward the robot 18 via the motorized latch 38 and thereby urging the mating feature 22 of the robot 18 into an interior space defined by the mating feature 14 of the cart 12, said brake release mechanism being exposed within the interior space.

Figure 4:
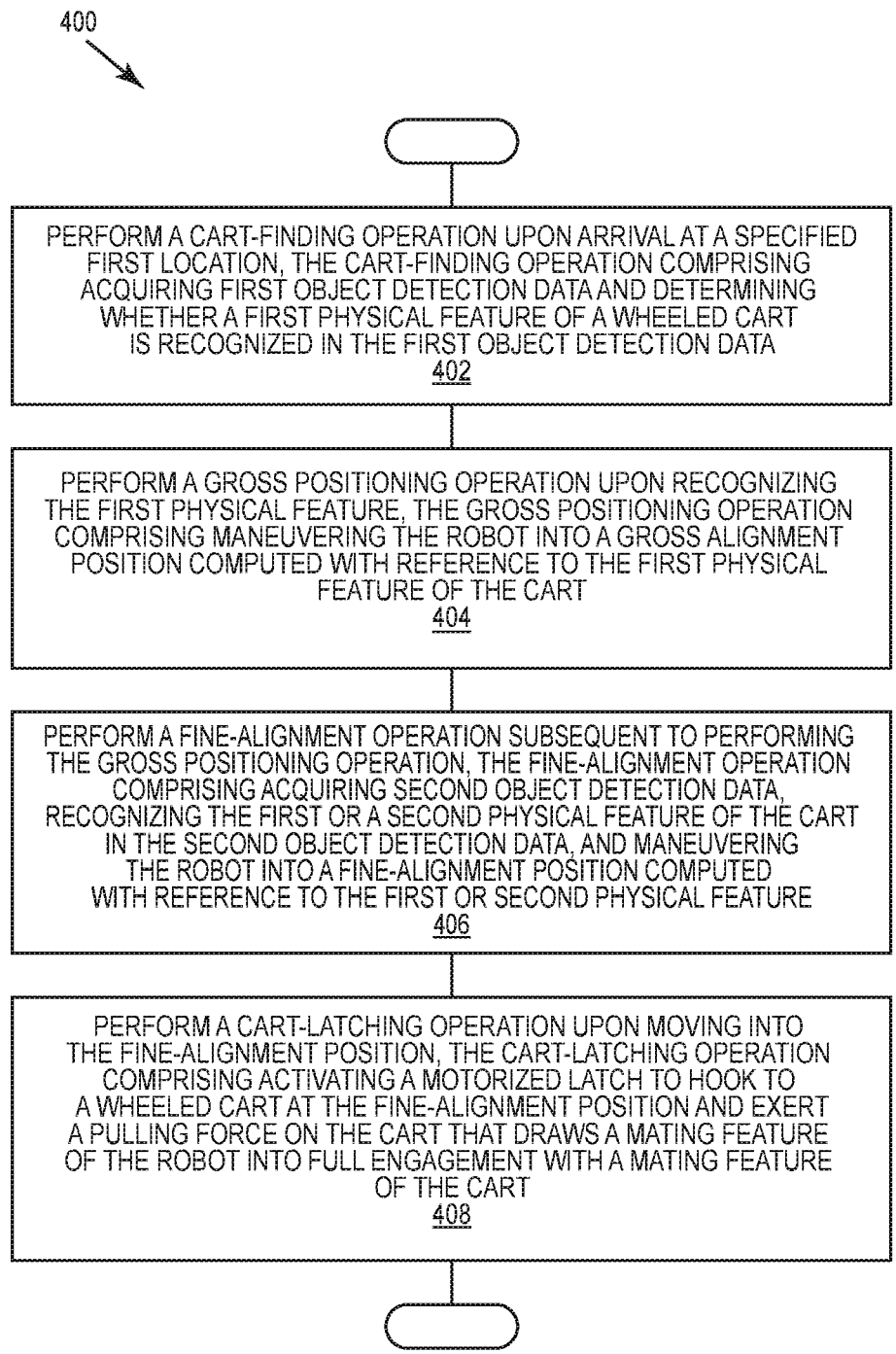
FIG. 4 is a logic flow diagram of another embodiment of a method of coupling to and conveying a wheeled cart, as carried out by a mobile robot.

FIG. 4 illustrates another example method 400, which may be based on some or all of the method steps described for the method 200 and/or 300. However, the method 400 is not limited to such implementations and, as illustrated, includes an autonomously-navigating mobile robot, such as the robot 18, performing (Block 402) a cart-finding operation upon arrival at a specified first location. The cart-finding operation comprises acquiring first object detection data and determining whether a first physical feature of a cart 12 is recognized in the first object detection data.

The method 400 further includes performing (Block 404) a gross positioning operation upon recognizing the first physical feature. The gross positioning operation comprises maneuvering the robot 18 into a gross alignment position computed with reference to the first physical feature of the cart 12. Operations continue with the robot 18 performing a fine-alignment operation subsequent to performing (Block 406) the gross positioning operation.

The fine-alignment operation comprises acquiring second object detection data, recognizing the first or a second physical feature of the cart 12 in the second object detection data, and maneuvering the robot 18 into a fine-alignment position computed with reference to the first or second physical feature. Operations continue with the robot 18 performing (Block 408) a cart-latching operation upon moving into the fine-alignment position. The cart-latching operation comprises activating a motorized latch 38 at the fine-alignment position, to hook to the cart 12 and exert a pulling force on the cart 12 that draws a mating feature 22 of the robot 18 into engagement with a mating feature 14 of the cart 12.

FIG. 5 provides a side view of the cart 12 and the robot 18, according to example embodiments of the cart 12 and the robot 18. According to the illustrated configuration, the mating feature 14 of the cart 12 is mounted to the underside 50 of a shelf or panel included in the cart 12. Further, one sees that the mating feature 22 of the robot 18 is mounted on and projects upward from a top surface 52 of the wheeled housing assembly 20 of the robot 18.

Additionally, the one or more sensors 36 introduced in FIG. 1 are implemented here as first and second sensors 36-1 and 36-2. The first and second sensors 36-1 and 36-2 comprise, for example, first and second object detection sensors, such as laser scanners. Laser scanners, also referred to as LIDAR devices, provide distance and angle data corresponding to objects detected by the scanning laser. The first sensor 36-1 scans some angular range of a first scanning plane 54-1, and the second sensor 36-2 scans some angular range of a second scanning plane 54-2. In this example, the first scanning plane 54-1 is at an elevation that intersects with cart-detection features on the cart 12, and the second scanning plane 54-2 is at an elevation that intersects with the mating feature 14 of the cart 12.

FIG. 5 also illustrates a sub-assembly housing 66 positioned behind the mating feature 22. As will be seen, the sub-assembly housing contains the motorized latch 38. Here, the term "behind" connotes a frame of reference defined by the front of the robot 18, which in the diagram faces left towards the rear of the cart 12. Correspondingly, one sees the sensor 36-2 mounted at the front of the mating feature 22.

Figure 6:
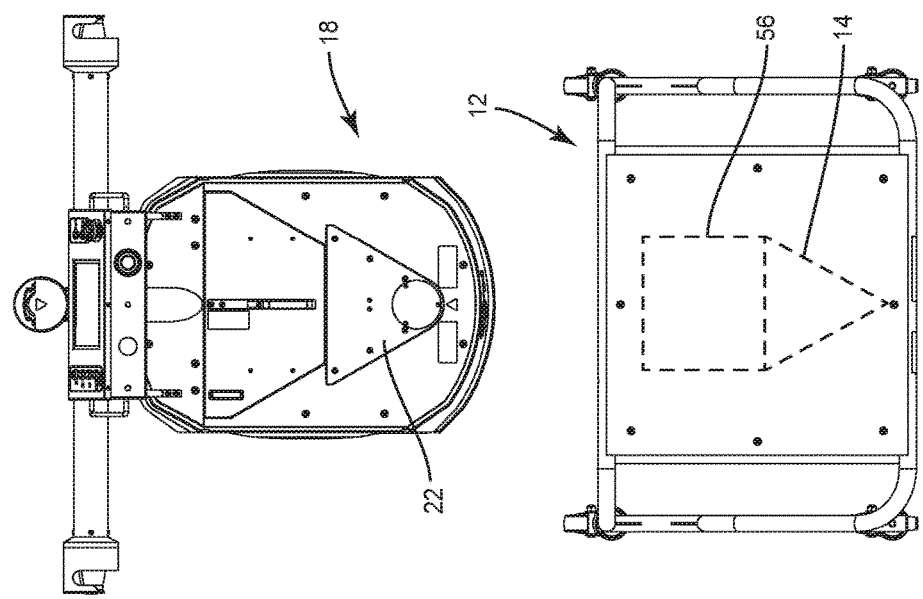
FIG. 6 is a top view of the mobile robot and wheeled cart introduced in FIG. 5.

FIG. 6 illustrates a top or plan view of the robot 18 and cart 12. The mating feature 14 is shown in dashed lines as a consequence of being mounted on the underside the cart panel 50 shown in FIG. 5. In one or more configurations, that panel includes a cutout 56 to facilitate latching by the motorized latch 38 of the cart 12.

Figure 7:
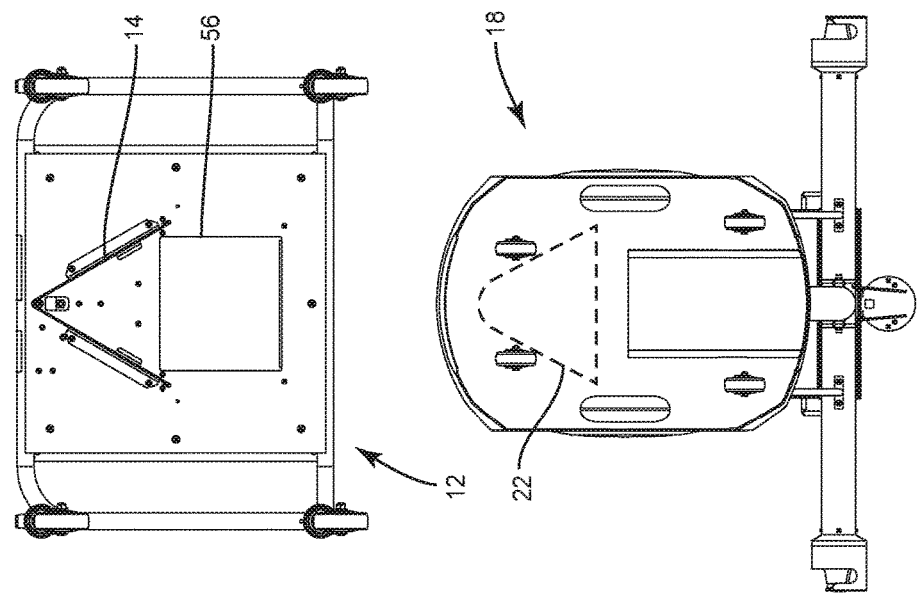
FIG. 7 is a bottom view of the mobile robot and wheeled cart introduced in FIG. 5.

The mating feature 14 and cutout 56 are better seen in the bottom view provided in FIG. 7. Notably. FIGS. 6 and 7 illustrate contemplated but non-limiting details, wherein the mating feature 14 of the cart 12 is a V-shaped mating receptacle and the mating feature 22 of the robot 18 is a complementary mating wedge that is sized for insertion into the interior space defined by sidewalls of the V-shaped mating receptacle. The mechanical engagement provided by the wedge-shape of the mating feature 22 and the V-shape of the mating feature 14 facilitates alignment as the mating feature 22 moves into engagement with the mating feature 14, and provides for robust retention of the mechanical engagement during cart transport.

Figure 8:
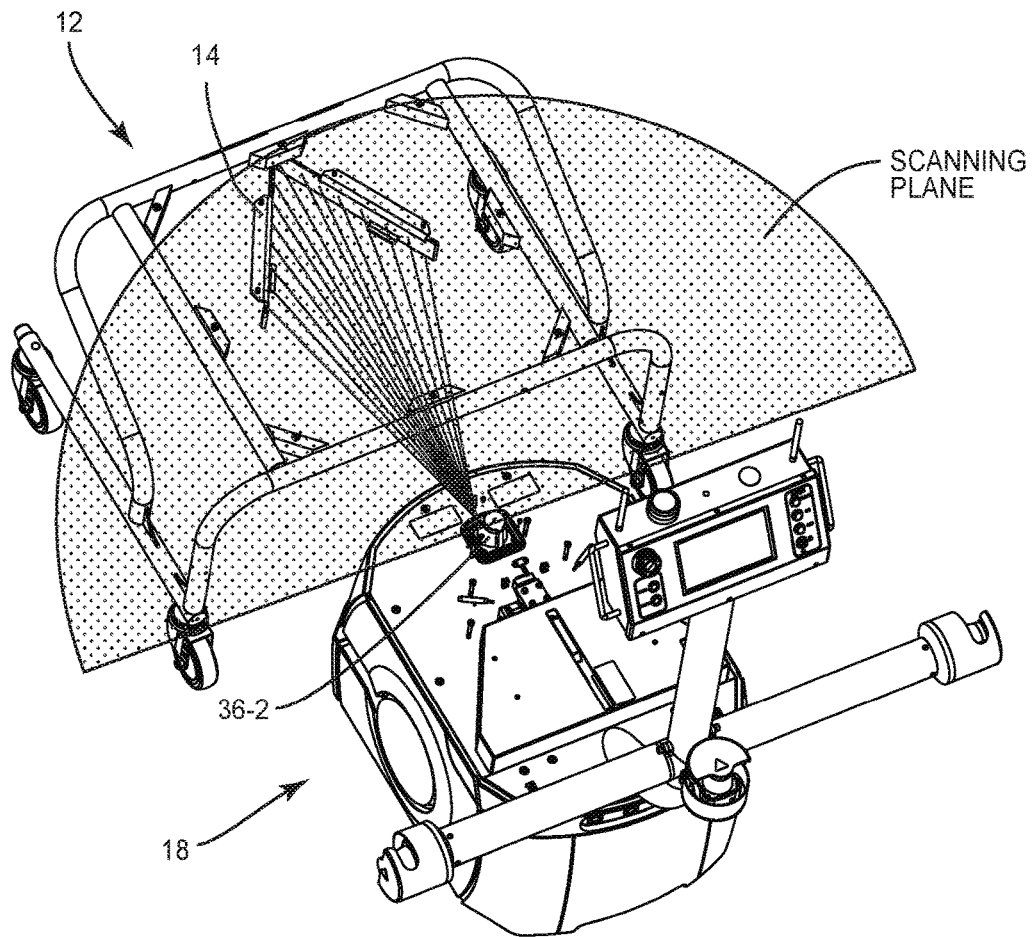
FIG. 8 is a perspective view of the mobile robot and wheeled cart, with annotations highlighting various aspects of the cart detection and coupling capabilities of the mobile robot.

FIG. 8 shows the cart 12 and the robot 18 from a top-rear perspective view. Here, the cart 12 is shown without the panel(s) used to mount the mating feature 14, to better illustrate scanning of the mating feature 14 by the sensor 36-2 of the robot 18.

Figure 9:
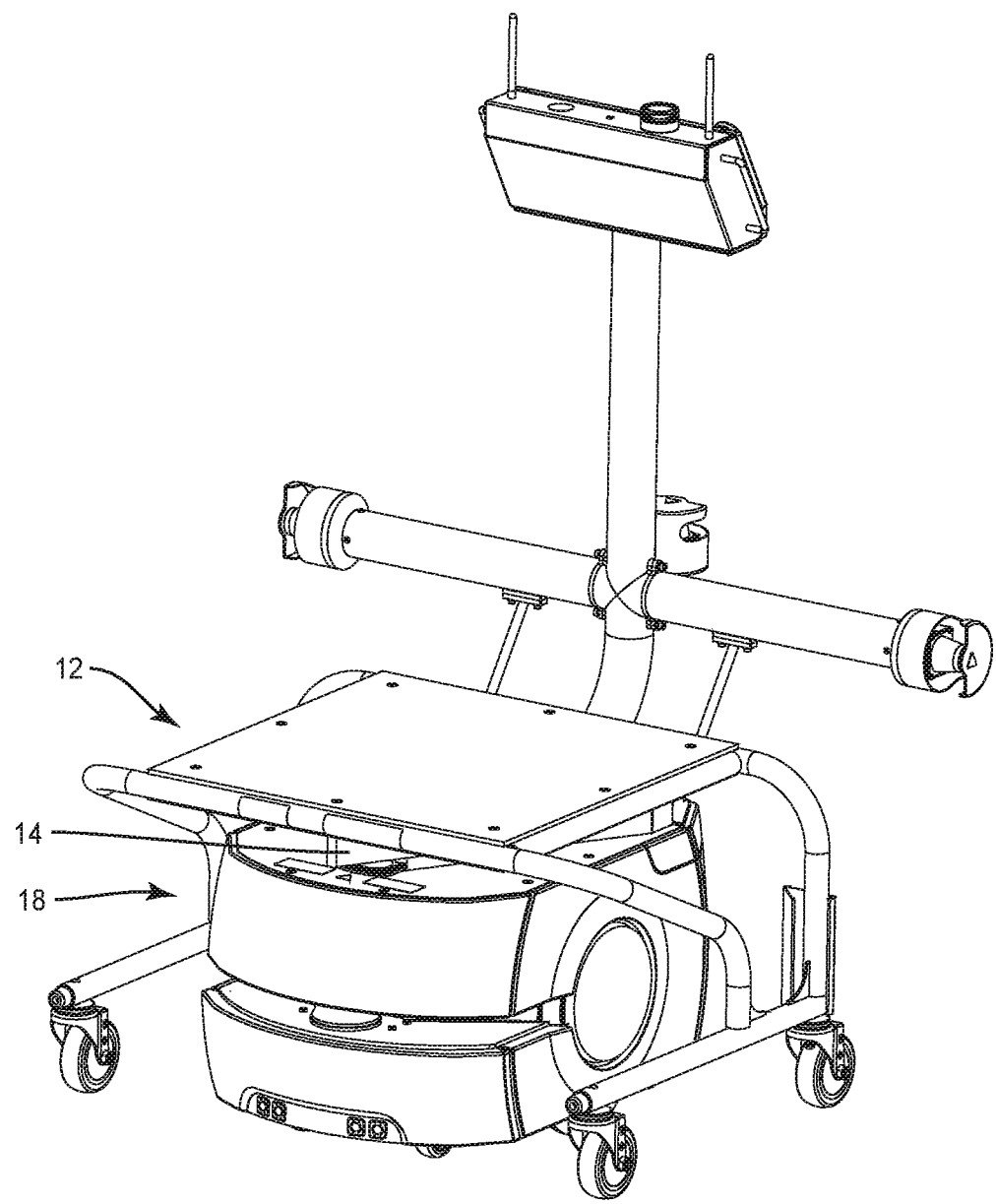
FIG. 9 is a perspective view of the mobile robot and wheeled cart, depicted in their coupled arrangement.

FIG. 9 illustrates the robot 18 after it has moved into a fine alignment position and engaged the cart 12. Notably, the robot 18 does not lift the cart 12. Instead, the cart 12 rolls with the robot 18, based on the mating feature 22 of the robot 18 being drawn into engagement with the mating feature 14 of the cart 12, as a consequence of the biasing or pulling force exerted by the motorized latch 38 of the robot 18.

Figure 10:
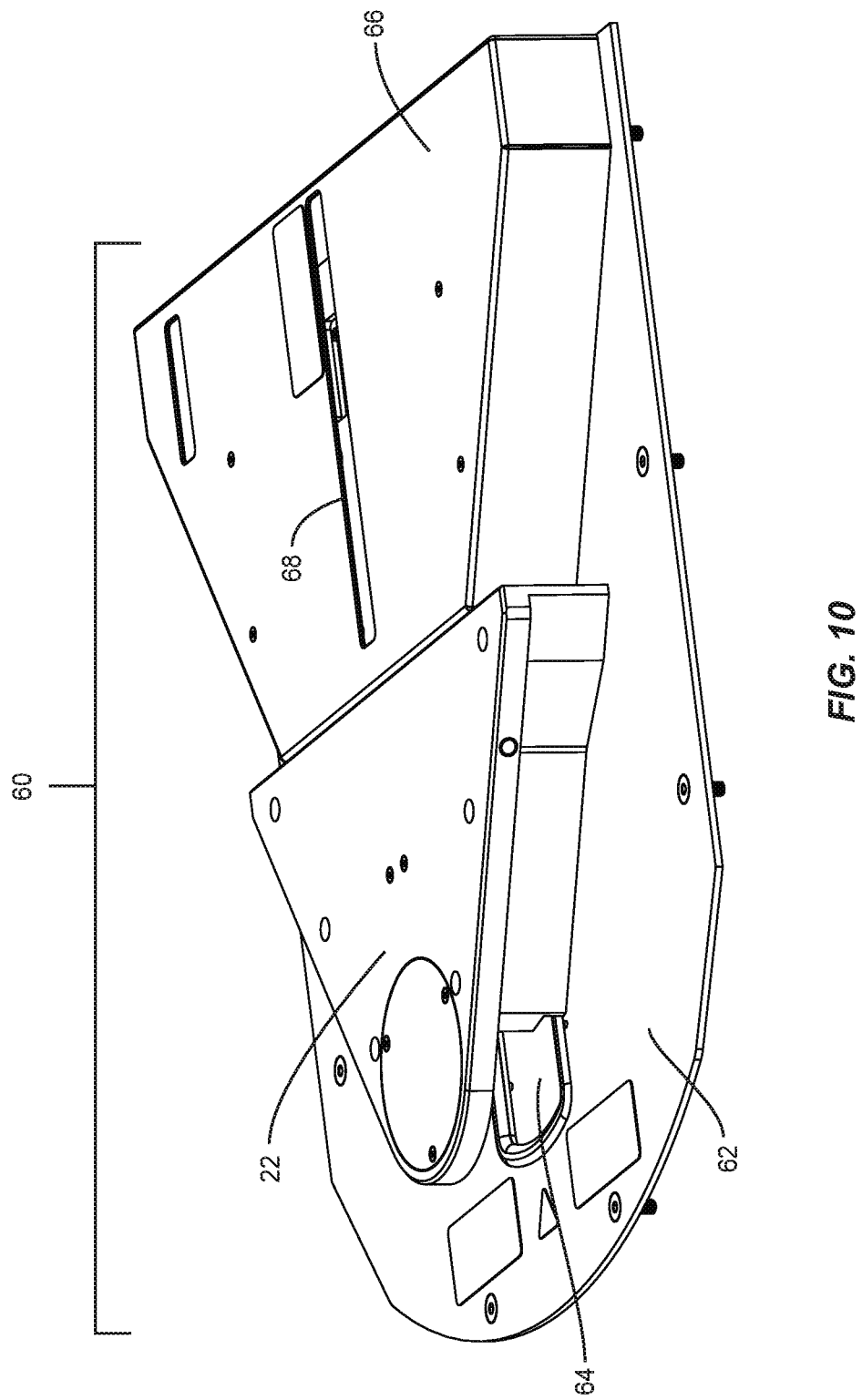
FIG. 10 is a perspective view of one embodiment of a mating wedge and a motorized latch, as may be mounted on a top surface of the mobile robot for use in coupling to the wheeled cart.

To better appreciate the latching details, FIG. 10 illustrates a perspective view of an assembly 60 that includes the mating feature 22 and the sub-assembly housing 66 that contains the motorized latch 38 introduced in FIG. 1. These components may be aggregated on a mounting plate or other substrate 62 that is mounted to or forms a portion of the top surface 52 of the wheeled housing assembly 20 of the robot 18.

FIG. 10 illustrates a receptacle or opening 64 at the forward or leading portion of the mating feature 22, for mounting of the sensor 36-2. Such mounting establishes a convenient relationship between the sensing origin or coordinate system of sensor 36-2 and the centerline and leading edge of the mating feature 22. FIG. 10 further illustrates a slot or opening 68 in the sub-assembly housing 66, which allows an arresting hook or other latching member of the motorized latch to project upward and engage a bottom-side feature of the cart 12, such as the edge of an underside panel cutout.

Figure 11:
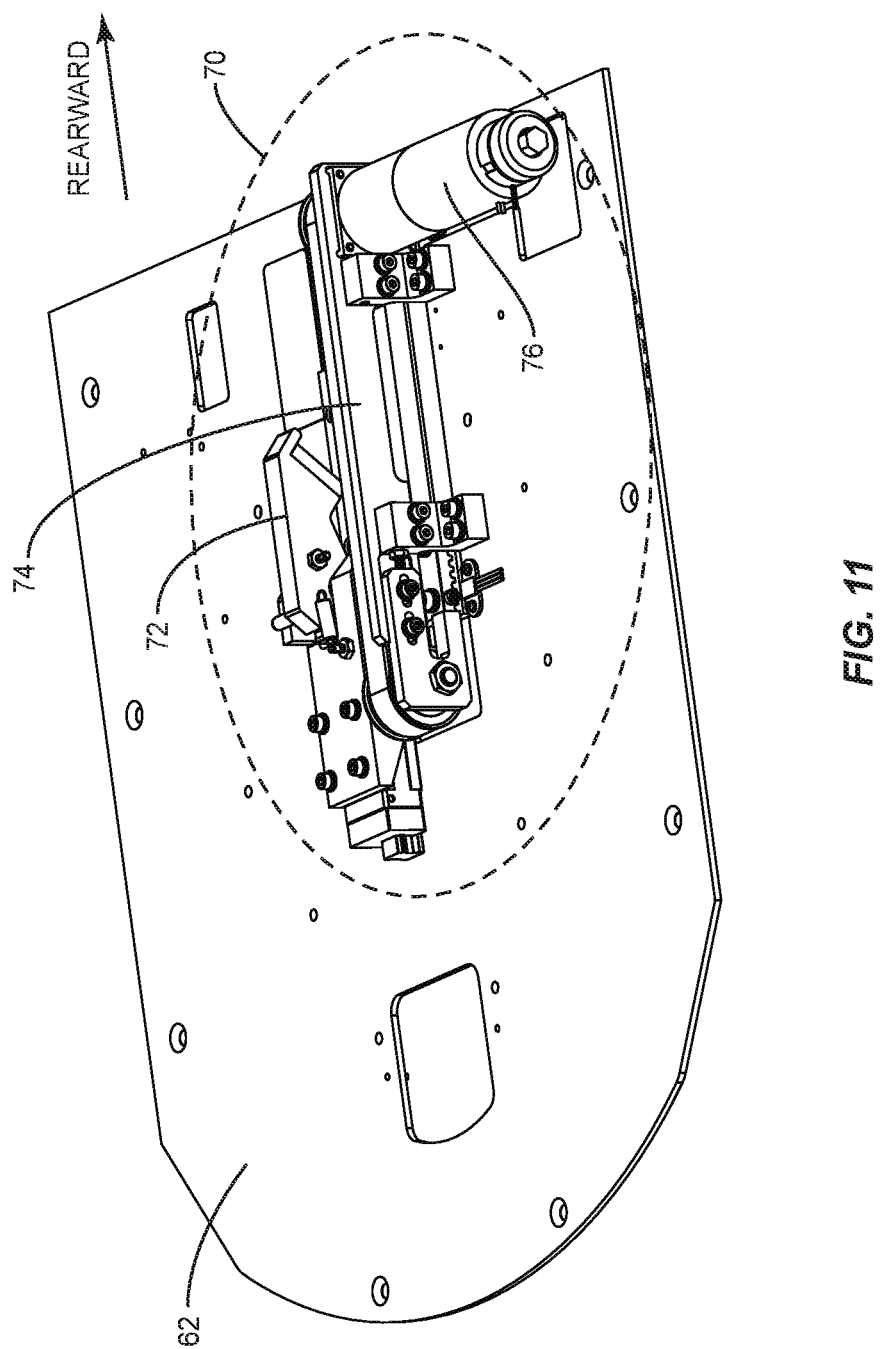
FIGS. 11-13 are perspective views of interior components of the motorized latch.
Figure 12:
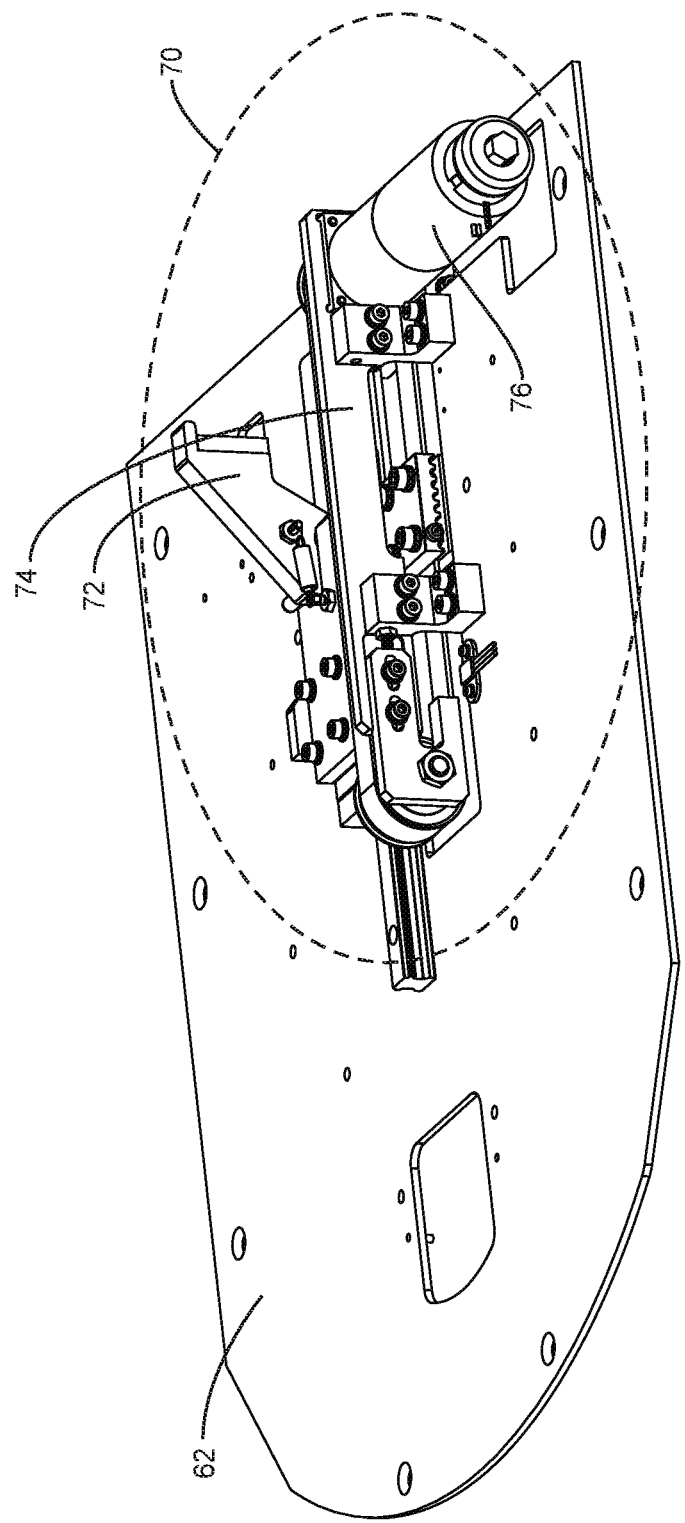
Figure 13:
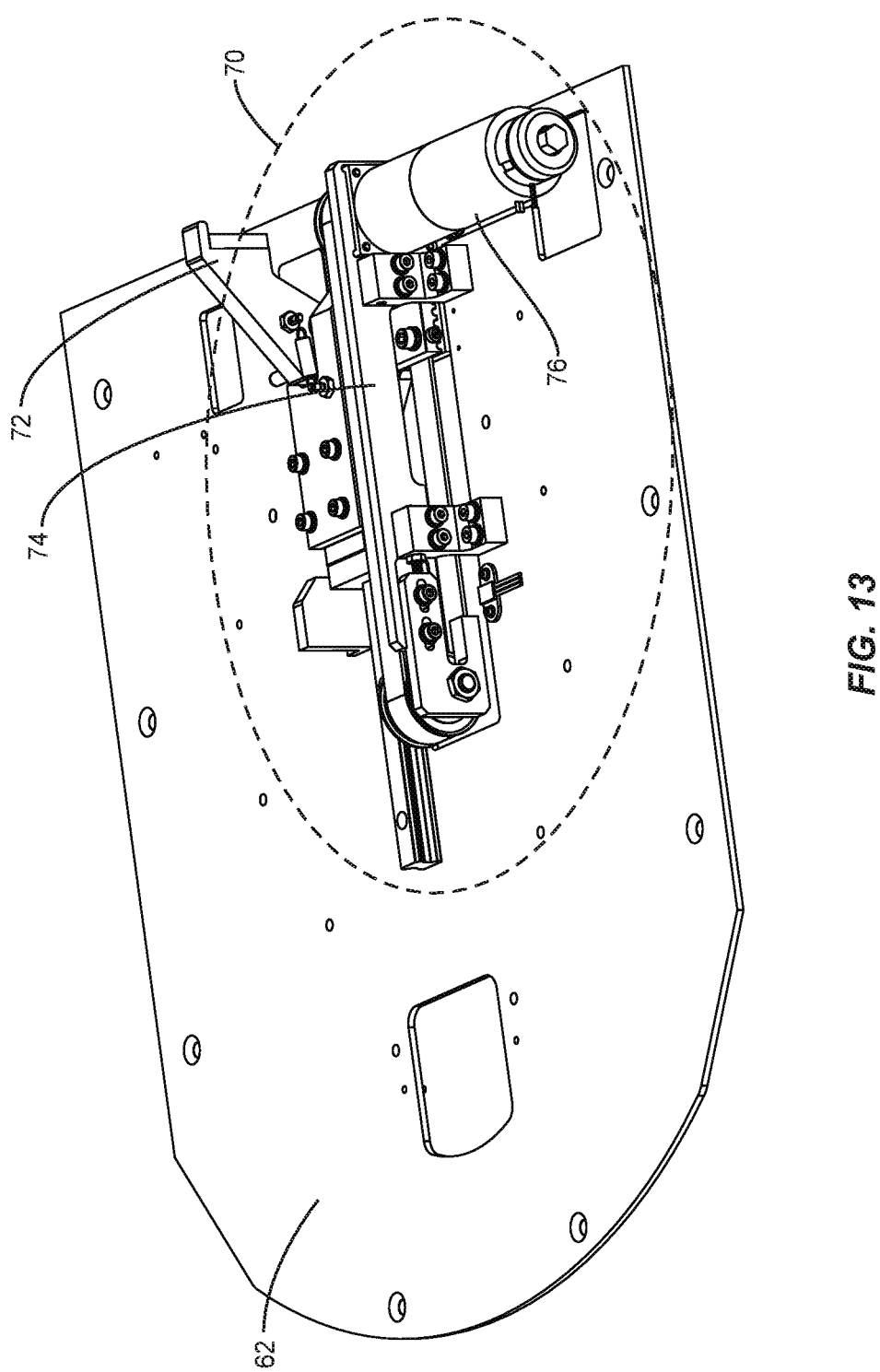

FIG. 11 illustrates the substrate 62 without the mating feature 22 and sub-assembly housing 66, to thereby expose the motorized latch 38, implemented here as a latch assembly 70 that includes a movable hook or other latching member 72 that moves linearly along a rail 74, based on motive power provided by a latch motor 76. FIG. 11 depicts the latching member 72 at rest, in the unlatched position, whereas FIG. 12 illustrates the latching member 72 as it moves rearward for latching with the cart 12. Notably, the latch assembly 70 is configured so that rearward movement of the latching member 72 along the rail 74 cause the latching member 72 to pivot or otherwise raise up, for engagement with the cart 12. Correspondingly, FIG. 13 illustrates the latching member 72 in a rearward position that corresponds to latched contact with the cart 12. With momentary reference back to FIGS. 6 and 7, the latching member 72 engages, for example, the inside rearward edge of the cart panel cutout 56.

Figure 14:
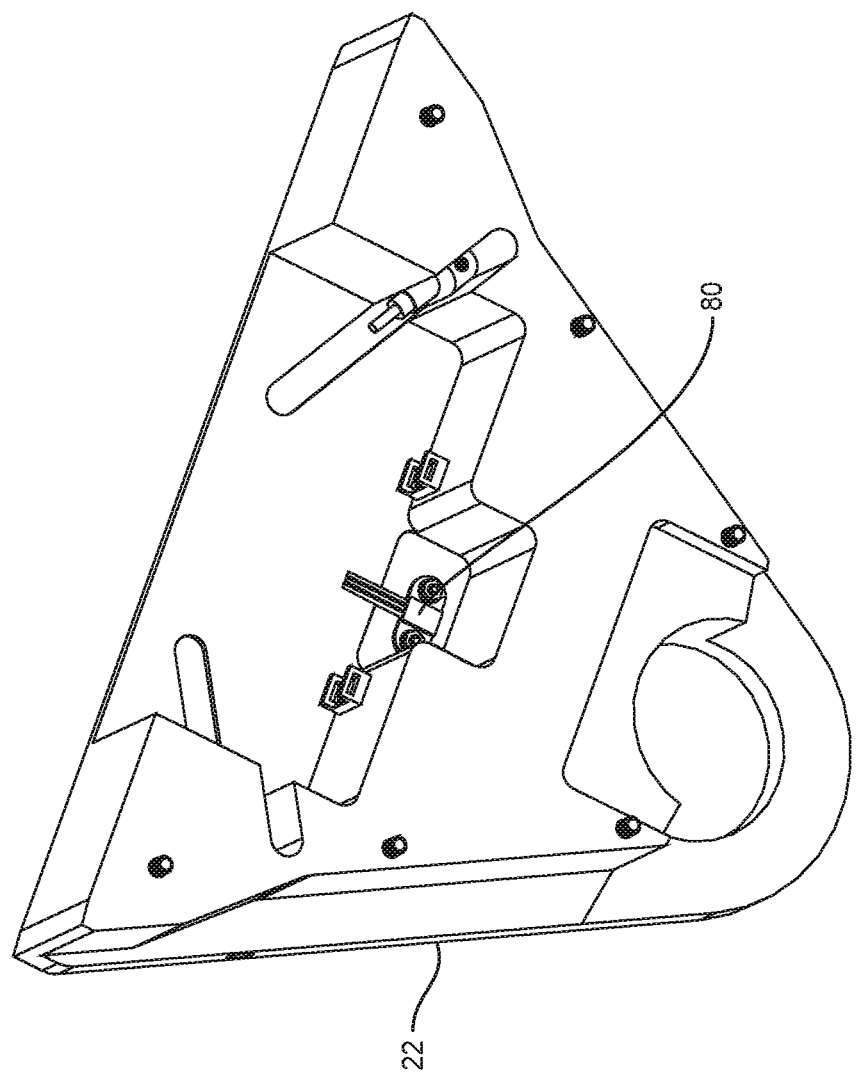
FIG. 14 is a perspective view of one embodiment of the mating wedge, with an integrated proximity sensor for use in coupling to the wheeled cart.

FIG. 14 illustrates a bottom view of the mating feature 22 of the robot 18 and particularly depicts a sensor assembly 80 that includes the proximity sensor 40 introduced in FIG. 1. The proximity sensor 40 comprises, for example, a Hall Effect sensor and the cart 12 has a magnet mounted in a complementary position on the cart 12. For example, the cart magnet is positioned such that it actuates the proximity sensor 40 of the robot 18 upon the mating feature 22 of the robot 18 reaching a certain insertion depth or degree of engagement with the mating feature 14 of the cart 12.

Upon actuation of the proximity sensor 40, the robot 18 uses the motorized latch 38 to draw the cart 12 toward the robot 18, thus forcing a full engagement between the mating sensors 14 and 22. In addition to the pulling force providing for biased engagement between the cart 12 and the robot 18, forcing the mating feature 22 into full engagement with the mating feature 14 can be exploited in other ways. For example, as seen in FIG. 15, the cart 12 may include a brake system or assembly 100 that includes brake-release cables 102 that are actuated by displacing or otherwise actuating on a brake release mechanism 104.

Figure 15:
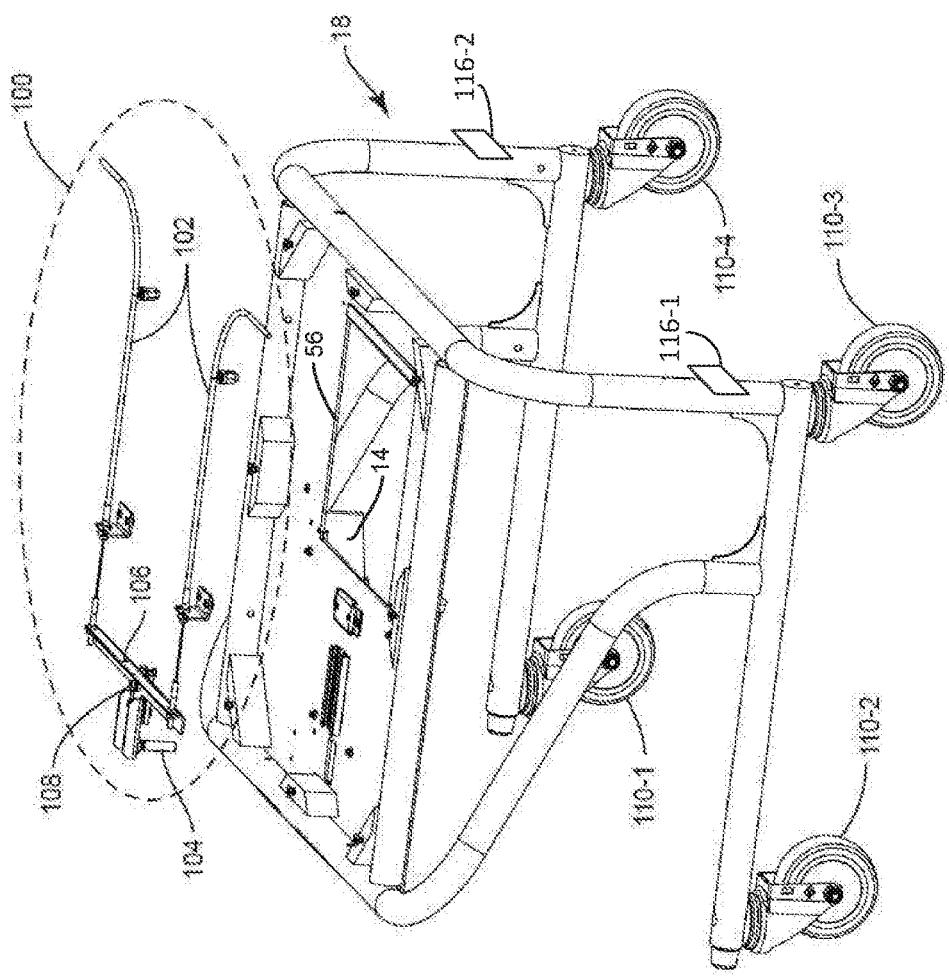
FIG. 15 is a perspective view of one embodiment of a wheeled cart and an associated braking system.

While FIG. 15 shows the brake assembly 100 in exploded view, it will be appreciated that the brake assembly 100 is integrated with the corresponding structure of the cart 12 so that the brake release mechanism 104 is positioned in a location where the mating feature 22 of the robot 18 actuates it, as the mating feature 22 of the robot 18 is drawn into engagement with the mating feature 14 of the cart 12. For example, the brake release mechanism 104 projects into the interior space defined by a V-shape of the mating feature 14 such that it is actuated by the mating feature 22 moving into that space.

Such actuation may involve the mating feature 22 of the robot 18 pushing the brake release mechanism 104 forward or upward, to thereby act on the bake-release cables 102. In particular, the brake release mechanism 104 may be connected to a rail or arm-like member 106 via pin or other connection 108. In turn, the brake-release cables 102 are anchored to the rail 106 and are pulled as a consequence of the rail 106 moving forward when the mating feature 22 of the robot 18 pushes the brake release mechanism 104 forward. The brake-release cables 102 may be routed, for example, down through the cart legs, at least in embodiments that make use of tubular members to form the cart legs.

Figure 16:
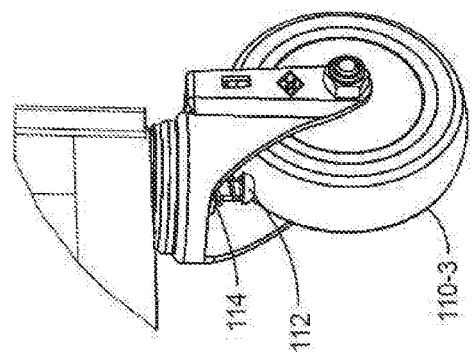
FIG. 16 is a perspective view of a wheel brake associated with the braking system depicted in FIG. 15.

In turn, as seen in FIG. 16, the opposite end of the brake-release cables 102 may connect to respective wheel brakes 112, which act against respective wheels 110 of the cart 12. In the example illustration, the cart 12 has front wheels 110-1 and 110-2 and rear wheels 110-3 and 110-4, and the brake-release cables 102 release wheel brakes 112 on the two rear wheels 110-3 and 110-4. As seen in the detail shown for the wheel 110-3 in FIG. 16, the wheel brake 112 may be biased against the wheel 110-3 via a spring 114, meaning that the brakes 112 are normally engaged and are released only when the robot 18 is engaged with the cart 12.

Turning back to FIG. 15, one sees flanges or plates 116-1 and 116-2 mounted or formed on the rear pair of vertical cart legs. In one or more embodiments, the plates 116-1 and 116-2 have a characteristic size and, by virtue of the leg spacing, have a characteristic distance between them. The distance between them and, more generally, their relative positions in space, define their "geometry" or spatial relationship, and the robot 18 may be programmed with size, shape, and geometry information for the plates 116-1 and 116-2, for use in detecting the presence of a cart 12. That is, it can evaluate object detection data acquired via its one or more sensors 36 and determine whether that data exhibits patterns or values characteristic of the plates 116-1 and 116-2 being within the sensor view of the robot 18.

Thus, the plates 116-1 and 116-2 may serve as a first physical feature for detection by the robot 18. If the robot 18 is "squared" and centered with respect to the rear of the cart 12, it would "see" symmetric angles and matching distances to the two plates 116-1 and 116-2. To the extent that the cart 12 is offset from the robot's center or is not square with the robot 18, the robot 18 will detect such misalignments based on the relative measurements recorded for the two plates 116-1 and 116-2. Thus, the plates 116 provide a convenient reference for the robot 18, for initially detecting or recognizing the presence of a compatible cart 12, and for determining the positioning of the cart 12 relative to the robot 18. The robot 18 may use such readings and its related calculations to move into initial gross alignment with the cart 12.

In some embodiments, the robot 18 also uses the plates 116 for achieving fine alignment, e.g., by taking new readings after gaining gross alignment and evaluating its position and distance relative to the cart 12 based on the new readings. In other embodiments, the robot 18 uses a second physical feature of the cart 12 for moving into a position of fine alignment with the cart 12. As noted earlier herein, in at least some embodiments, the robot 18 uses the mating feature 14 of the cart 12 as the second physical feature, and it performs fine alignment based on readings taken with respect to the mating feature 14. Also as noted, such readings may comprise laser scan data, image data, or other object detection data, in dependence on the nature of the sensor(s) 36 deployed on the robot 18.

The mating feature 14 of the cart 12 may comprise one or more geometric features, such as a triangular or V-shaped receptacle on the underside of a horizontal cart panel.

Correspondingly, the mating feature 22 of the robot 18 may be a complementarily sized mating wedge that is located on the top side of the robot 18 and configured to make contact with and engage the one or more geometric features.

The one or more geometric features comprising the mating feature 14 are, in an example embodiment, two linear plates (or brackets) of appropriate size that intersect at the appropriate angle so as to form a V-shaped receptacle on the underside of the bottom panel on the cart 12, the V-shaped receptacle being configured to receive the forward-facing surfaces of the triangular-shaped mating wedge on the top surface of the robot 18. The V-shaped receptacle on the cart 12 also makes the cart 12 more distinctive in "appearance" relative to its surroundings. That is, the exposed vertical faces defining the interior of the V-shaped receptacle provide a distinctive set of sensor readings or derived measurements for the robot 18—e.g., when scanned by a scanning laser, the V-shaped receptacle appears as two lines coming together at the vertex of the vee and the detected line lengths and angles provide the robot 18 with good data for finely aligning with the cart 12.

Thus, the V-shaped feature is a useful and convenient physical feature to have attached to the cart 12 because it produces a unique footprint in the sensor data acquired by the robot 18. And this unique footprint is used by the robot 18 to determine the precise location and orientation of the cart 12 while the robot 18 is positioning and aligning itself with the cart 12.

Alternatively, or in addition, the geometric features on the cart 12 may include but are not limited to reflectors mounted on the cart that appear unique to laser scanning sensors, or other specific geometry that can be detected by laser scanners, cameras, or other sensors to provide location feedback that can inform the motion of the robot 18 to aid the robot 18 in aligning itself with and latching onto the cart 12.

In one example, the cart 12 has unique identifying structures, such as folded pieces of sheet metal, affixed to the posts forming the legs of the cart 12. These features are mounted to the pair of cart legs that would face the robot 18 when the cart 12 is nominally positioned for pickup. These unique identifying features serve as physical reference for use by the robot 18 in recognizing the presence of the cart 12, and for use in determining cart orientation, etc.

For example, the robot 18 may know the size, shape, and spatial arrangement of leg plates or other identifying elements of the cart 12, and can evaluate laser scan data or other object detection data, to determine whether any portion or portions of such data are characteristic of the known size, shape, and spatial arrangement. Moreover, determining differences in the detected distances and angles to respective known features on the cart 12 enables the robot 18 to determine the angle and displacement of the cart 12 relative to the robot 18, which the robot 18 can compensate for during gross positioning.

As noted, the robot 18 may include one or more microprocessors and memory, along with one or more sensors 36 (including but not limited to 2D scanning lasers, cameras, single-point lasers). Software program instructions stored in the memory of the robot 18, when executed by the microprocessor, cause the microprocessor to use the incoming sensor data to detect carts 12 in the vicinity of a specified pickup location. The program instructions in the software are further arranged to cause the microprocessor to determine whether a detected cart 12 is acceptable or unacceptable for pickup by evaluating certain cart selection criteria, including without limitation:

1) the deviation of the cart 12 from the specified location;

2) the physical characteristics of the cart 12, e.g. the size of and distance between adjacent support members;

3) the presence or non-presence of the aforementioned geometric features on the bottom surface of the bottom panel of the detected cart 12; and 4) the presence or non-presence of unexpected obstacles barring the engagement of the cart 12.

The same information from these sensors may be used by the robot 18 to alter its route in order to allow it to better align itself with, engage, and latch a cart 12. This behavior affords the robot 18 the flexibility of engaging with carts 12 that are not "nominally" positioned relative to the designated location. This flexibility allows the robot 18 to detect carts 12 that are located some multiple meters away from their expected last location and/or detect and align with carts 12 that are offset or improperly oriented, although the cart 12 cannot be oriented in such a way that prevents the robot 18 from recognizing it or otherwise properly detecting it.

Example Cart-Detection and Gross Positioning Phase

Robots 18 operating in accordance with embodiments of the present invention use data received from onboard sensors to detect the presence of a cart 12. A variety of different types of sensors may be used to carry out this function, including without limitation, cameras, laser scanners, sonar sensors and radio frequency sensors. Embodiments of the present invention may also use inductive proximity sensors, hall-effect magnet sensors, other types of sensors, or other means of positively detecting the presence of a cart 12. The data received from the sensors may also be used to inform the automatic latching system on the robot 18 that it is safe to engage with the cart 12 and pull the cart 12 into a locked position on the robot 18.

The data may also be used to detect when a cart 12 has been latched onto the robot 18 by a human being. If the system detects that a cart 12 is present, but it has not been safely latched into place, then the software instructions in the memory of the robot 18 may be configured to prevent the robot 18 from moving at all. The data from the sensors can also be used while the robot 18 is driving in order to detect the unexpected appearance of, or the unexpected loss of a cart 12, and to react by, for example, stopping the robot 18 immediately and notifying human monitors or operators via wireless signal or displaying an error message on a display screen attached to the robot 18. For instance, if a person manually attaches a cart 12 to a robot 18 without properly latching the cart 12 into a secure and stable position on the robot 18, or if a person unexpectedly removes a cart 12 from the robot 18 before the intended destination is reached, then the robot 18 may be configured to detect the change in the status of the cart 12 and take action, such as coming to an immediate halt, sounding an alarm, and/or transmitting or displaying a warning or caution message to another device or computer system.

For cart detection, the robot 18 in at least some embodiments scans in a two-dimensional plane to look for two vertical support members of a cart 12. The software for the cart-finding process evaluates distance and angle measurements and determines if clusters of points are within allowable tolerance to match the size and geometry of a cart 12 support member. If so, then the potential post must also be the appropriate distance from the robot's laser scanner to be accepted as one of the posts on a cart 12 that is eligible for pickup. In an example embodiment, in order for the robot 18 to determine that what it is "seeing" in the incoming sensor data constitutes an eligible cart 12, the robot 18 must find two posts that are within a certain predefined distance of each other.

Suppose, for example, that the carts 12 in a particular facility or location have support members that are 0.5 meters apart. This distance between the posts is stored or pre-programmed in the robot 18. Thereafter, if the robot 18 detects two potential posts that are 1.5 meters apart, then the robot 18 will determine that the two posts are unlikely to be the posts on an eligible cart 12. Consequently, the robot 18 will reject the two posts and continue scanning the environment for the location of two potential posts that are 0.5 meters apart.

On the other hand, if the robot 18 determines through the sensor input that two potential posts are the correct distance apart from each other, then the distance and relative angle of rotation between the two posts and the current position of the robot 18 are evaluated and confirmed. The robot 18 uses this data to move itself into alignment with the cart 12. Once the robot 18 detects through sensor input that it is properly aligned with the cart 12 posts (i.e., positioned and oriented to be within a predetermined allowable tolerance), then the cart-detection and gross positioning phase is considered complete.

In some embodiments, the robot 18 takes a sensor reading of the surrounding environment to determine the location and orientation of the cart 12, and then drives directly to the front of the robot 18 to initiate the fine adjustment phase (phase 2) without taking additional sensor readings or making heading and speed adjustments during the drive up to the cart 12. This approach is sometimes referred to as "dead-reckoning." In other embodiments, the robot 18 periodically takes additional sensor readings (e.g., a new sensor reading every 1.0 seconds) while the robot 18 is approaching the identified cart 12, so that the robot 18 can adjust heading and speed in accordance with changes or potential changes in the position and/or orientation of the cart 12 while the robot 18 approaches the cart 12. Using periodic sensor feedback to make heading and speed adjustments during the drive up to the cart 12 may, or may not, be preferred, depending on the operating environment for the robot 18 and the cart 12.

During the approach, contact between the robot 18 and a fine adjustment feature on the cart 12 is not required. In fact, in some embodiments, contact is actively avoided. Instead, the robot 18 is instructed to drive toward the fine-alignment feature until a sensor on the robot 18 is triggered by a feature of the cart—in this case a magnet that triggers a hall-effect magnet sensor.

Alternatively, the robot 18 may be configured to travel to a point in space and stop with no feedback from anything external to the robot 18. Again, this method is referred to as dead-reckoning toward a predefined point. In other embodiments, the robot 18 is configured to continuously receive feedback from the fine alignment feature on the cart 12 as the robot 18 approaches the cart 12, and stop when the microprocessor of the robot 18 detects that the sensor data indicates that the robot 18 has reached a predetermined distance from the fine alignment feature.

Example Fine-Alignment Phase

After the robot 18 is suitably positioned in front of the cart 12, it may then perform an additional sensor-guided procedure to drive underneath the cart 12 into a more precise position where it can latch the cart 12 onto itself. In some embodiments, a triangular-shaped geometric feature located on the underside of the cart 12 is detected by the robot 18 as a fine-alignment feature and relied upon by the robot 18 to help guide the automatic driving and positioning of the robot 18 into a position of fine alignment.

Similar to the cart-detection and gross alignment procedure described above, where the robot 18 identifies an eligible cart 12 based on the shape and locations of its vertical supports or other known characteristic physical features, in the fine-alignment phase the robot 18 uses laser scanning plane data, or other object detection data, to look for the V-shaped fine alignment feature. Thus, the robot 18 evaluates the object detection data to determine whether the robot 18 "sees" two substantially straight-line structures (e.g., flanges) located underneath the bottom panel of the cart 12. More particularly, the robot 18 looks for two straight-line segments (e.g., flanges) that intersect so as to form what appears to the robot 18 to constitute "V" shape, also referred to as a "cart-capture triangle."

The length of the line segments found, the angle between the line segments, the distance from their intersection point to the robot 18, and the angle between the robot 18 and the V-structure are among the collection of metrics that may be used by the robot 18 to determine whether an appropriate triangle or V-structure has been located. Thus, robots 18 operating according to some embodiments disclosed herein have a scanning laser or other sensor suitably positioned at substantially the same height as the cart's V-shaped feature.

It is also worth noting that the leg flanges or other distinctive elements of the cart 12 may be regarded as a first physical feature that can be recognized by the robot 18 for cart detection and gross alignment, whereas the V-shaped fine-alignment feature may be regarded as a second physical feature that can be recognized by the robot 18 for moving into fine alignment with the cart 12. As a particular advantage, the fine-alignment feature may be the mating feature 14 of the cart 12.

In addition to being used as reference geometry for the robot 18's fine alignment, the cart-capture triangle is also used as a bearing surface that matches the contour of a wedge structure on top of the robot 18. Once the cart 12 is locked onto the robot 18, which maintains engagement between the mating features 14 and 22 of the cart 12 and robot 18, respectively, the cart 12 will roll along with the motion of the robot 18 in a stable and predictable manner. Depending on the geometry of the robots 18, and the placement and range of the sensor(s) 36 used to detect obstacles during transit, the support members of the carts 12 used with embodiments of the present invention are preferably configured such that object-detection by the robot 18 during transit is not impaired. In embodiments where multiple sensors 36 are deployed on the robot 18, it may be sufficient for at least one sensor 36 to be unimpaired by the latched cart 12.

For example, one sensor 36-1 may be used for general object detection and put to use for cart detection and gross alignment, and another sensor 36-2 may be used for fine alignment operations when mating with and latching to a cart 12. In such cases, it is sufficient if the latched cart 12 does not substantially obstruct the view of the sensor 36-1. Of course, additional sensors 36 may be deployed on the robot 18.

Example Cart-to-Robot Latching Phase

Referring back to FIGS. 5-7, the mating feature 14 of the cart 12 is a triangular or V-shaped receptacle in the depicted embodiments and is mounted on the underside of a horizontal plate 50 of the cart 12. The mating feature 22 of the robot 18 is a wedge-shaped member that is configured for seated engagement in the vee formed by the mating feature 14. The V-shaped receptacle may have folded edges—e.g., the vertical sidewalls forming the vee may terminate in a horizontal lip—and the top portion of the mating wedge on the robot 18 may form a slight overhang that projects over the horizontal lips of the V-shaped receptacle. Such features allow the mating wedge to move horizontally into and out of the V-shaped space defined by the mating feature 14 of the cart 12, but prevent the cart from bouncing or jostling upward off of the mating wedge during transit.

Referring back to FIG. 11, in at least some embodiments, a motor brake is attached to the motor 76 of the motorized latch assembly 70, to drive the latching member 72 in the rearward direction (with "rearward" taken in the sense indicated in the drawing), to lock the bottom panel 50 of the cart 12 into place. This configuration permits the cart 12 to stay locked to the robot 18 without requiring that there be a continuous current for the motor to maintain the latching member's pressure on the bottom panel of the cart 12. In other embodiments, the motor 76 may not have a motor brake, and continued motor power may be used to sustain the locking force during transit.

In order to facilitate the release of the cart 12 and permit the robot 18 to back out and away from the cart 12, the latching member 72—also referred to as a "cart-arresting hook"—may be spring-biased so that the latching member 72 remains in the extended ("up") position until the movement of an angled block in contact with a cam follower on the latching member 72 overcomes the spring's bias and causes the latching member 72 to rotate to a down or retracted position that allows the robot 18 to reverse out from underneath the cart 12 without engaging the cutout 56 of the bottom panel 50 (as seen in FIGS. 5 and 6).

The above-described preferred embodiments are intended to illustrate the principles of the invention, but not to limit its scope. Various other embodiments, modifications and equivalents to these preferred embodiments may occur to those skilled in the art upon reading the present disclosure or practicing the claimed invention. Such variations, modifications and equivalents are intended to come within the scope of the invention and the appended claims.

What is claimed is:

1. A method performed by an autonomously-navigating mobile robot, the method comprising:
   moving to a specified first location having a wheeled cart parked proximate to the first location;
   detecting, via first sensor data acquired by the robot after moving to the first location, a first physical feature of the cart and determining relative distances and angles for the first physical feature from the first sensor data;
   maneuvering the robot into a gross alignment position with respect to the cart, based on the relative distances and angles determined for the first physical feature from the first sensor data;
   detecting, via second sensor data acquired by the robot after moving to the gross alignment position, the first physical feature or a second physical feature of the cart and determining relative distances and angles for the first or second physical feature from the second sensor data;
   maneuvering the robot into a fine-alignment position with respect to the cart, based on the relative distances and angles determined for the first or second physical feature from the second sensor data;
   latching to the cart after reaching the fine-alignment position; and
   moving to a specified second location with the cart latched to the robot in rolling engagement, and unlatching and disengaging from the cart at the specified second location.

2. The method of claim 1, wherein maneuvering the robot into the gross alignment position comprises moving and steering the robot to compensate for an initial misalignment between the cart and the robot, as calculated from the relative distances and angles determined for the first physical feature from the first sensor data.

3. The method of claim 1, wherein maneuvering into the fine-alignment position comprises advancing toward the cart from the gross alignment position via dead reckoning, according to the relative distances and angles determined for the first or second physical feature from the second sensor data.

4. The method of claim 1, further comprising acquiring the first and second sensor data from first and second object detection sensors, respectively.

5. The method of claim 1, wherein the first physical feature of the cart has a known first geometry and wherein detecting the first physical feature via the first sensor data comprises determining that a portion of the first sensor data is characteristic of the first geometry.

6. The method of claim 5, wherein the second physical feature of the cart has a known second geometry and wherein detecting the second physical feature via the second sensor data comprises determining that a portion of the second sensor data is characteristic of the second geometry.

7. The method of claim 6,
   wherein the first sensor data comprises first object detection data comprising a first plurality of points having associated distances and angles, and wherein detecting that the portion of the first sensor data is characteristic of the first physical feature comprises detecting that one or more clusters of points in the first plurality of points are consistent with the first geometry and with associated size information known for the first physical feature, and
   wherein the second sensor data comprises second object detection data comprising a second plurality of points having associated distances and angles, and wherein detecting that the portion of the second sensor data is characteristic of the second physical feature comprises detecting that one or more clusters of points in the second plurality of points are consistent with the second geometry and with associated size information known for the second physical feature.

8. The method of claim 6, wherein the second feature is a mating feature of the cart configured for mating with a complementary mating feature of the robot, and wherein maneuvering the robot into the fine-alignment position with respect to the cart, based on the relative distances and angles determined for the first or second physical feature from the second sensor data, comprises determining a center point of the mating feature of the cart and moving the robot so as to bring the complementary mating feature of the robot into centered engagement with the mating feature of the cart.

9. The method of claim 8, wherein the mating feature of the cart is a V-shaped receptacle, and wherein determining the center point comprises determining the vertex of the V-shaped receptacle based on detecting, from the second sensor data, line lengths and angles corresponding to side walls of the V-shaped receptacle.

10. The method of claim 1, wherein the method comprises referencing the first physical feature for moving into the gross alignment position and referencing the second physical feature for moving from the gross alignment position and into the fine-alignment position, and wherein the second physical feature is a mating feature of the cart configured for engagement by the robot.

11. The method of claim 10, wherein detecting the second physical feature via the second sensor data comprises determining, based on the detection of the first physical feature and a known spatial relationship between the first and second physical features, a location where the second physical feature is expected to be detected, and determining that the portion of the second sensor data corresponding to the expected location is characteristic of the second physical feature.

12. The method of claim 1, wherein maneuvering the robot into the fine-alignment position with respect to the cart, based on the relative distances and angles determined for the first or second physical feature from the second sensor data, comprises advancing toward the cart from the gross alignment position, based on a distance computed as a function of the relative distances determined for the second physical feature, and terminating the advance responsive to a proximity sensor associated with a mating feature of the robot being triggered by a sensor actuator associated with a complementary mating feature of the cart.

13. The method of claim 1, wherein latching to the cart after reaching the fine-alignment position comprises activating a motorized latch responsive to the proximity sensor being triggered, the motorized latch being configured to releasably hook to the cart and exert a pulling force on the cart that retains the complementary mating feature of the cart in engagement with the mating feature of the robot.

14. The method of claim 1, wherein latching to the cart after reaching the fine-alignment position includes exerting a pulling force on the cart via a motorized latch of the robot, said pulling force urging a mating feature of the robot into engagement with a complementary mating feature of the cart and thereby actuating a brake release mechanism of the cart.

15. An autonomously-navigating mobile robot comprising:
   a wheeled housing assembly including or having mounted thereon a mating feature configured for engaging with a complementary mating feature of a wheeled cart;
   a drive system comprising one or more motors and steering actuators configured to provide drive and steering control for the robot;
   one or more sensors configured to provide sensor data for the surrounding physical environment of the robot;
   a control system and associated interface circuitry operatively associated with the drive system and the one or more sensors, and configured to:
      move the robot to a specified first location, said cart being parked proximate to the first location;
      detect, via first sensor data acquired by the robot after moving to the first location, a first physical feature of the cart and determine relative distances and angles for the first physical feature from the first sensor data;
      maneuver the robot into a gross alignment position with respect to the cart, based on the relative distances and angles determined for the first physical feature from the first sensor data;
      detect, via second sensor data acquired by the robot after moving to the gross alignment position, the first physical feature or a second physical feature of the cart and determine relative distances and angles for the first or second physical feature from the second sensor data;
      maneuver the robot into a fine-alignment position with respect to the cart, based on the relative distances and angles determined for the first or second physical feature from the second sensor data;
      latch to the cart after reaching the fine-alignment position; and
      move to a specified second location with the cart latched to the robot in rolling engagement, and unlatch and disengage from the cart at the specified second location.

16. The robot of claim 15, wherein the control system is configured to maneuver the robot into the gross alignment position by moving and steering the robot to compensate for an initial misalignment between the cart and the robot, as calculated from the relative distances and angles determined for the first physical feature from the first sensor data.

17. The robot of claim 15, wherein the control system is configured to maneuver into the fine-alignment position by advancing the robot toward the cart from the gross alignment position via dead reckoning, according to the relative distances and angles determined for the first or second physical feature from the second sensor data.

18. The robot of claim 15, wherein the one or more sensors comprise first and second object detection sensors and wherein the control system is configured to acquire the first and second sensor data from the first and second object detection sensors, respectively.

19. The robot of claim 15, wherein the first physical feature of the cart has a first geometry known to the control system and wherein the control system is configured to detect the first physical feature via the first sensor data by determining that a portion of the first sensor data is characteristic of the first geometry.

20. The robot of claim 19, wherein the second physical feature of the cart has a second geometry known to the control system and wherein the control system is configured to detect the second physical feature via the second sensor data by determining that a portion of the second sensor data is characteristic of the second geometry.

21. The robot of claim 20,
   wherein the first sensor data comprises first object detection data comprising a first plurality of points having associated distances and angles, and wherein the control system is configured to detect that the portion of the first sensor data is characteristic of the first physical feature by determining that one or more clusters of points in the first plurality of points are consistent with the first geometry and with associated size information known for the first physical feature, and
   wherein the second sensor data comprises second object detection data comprising a second plurality of points having associated distances and angles, and wherein the control system is configured to detect that the portion of the second sensor data is characteristic of the second physical feature by determining that one or more clusters of points in the second plurality of points are consistent with the second geometry and with associated size information known for the second physical feature.

22. The robot of claim 20, wherein the second feature is the complementary mating feature of the cart, and wherein the control system is configured to maneuver the robot into the fine-alignment position with respect to the cart by determining a center point of the complementary mating feature of the cart and moving the robot so as to bring the mating feature of the robot into centered engagement with the complementary mating feature of the cart.

23. The robot of claim 22, wherein the complementary mating feature of the cart is a V-shaped receptacle, and wherein the control system is configured to determine the center point by determining the vertex of the V-shaped receptacle based on detecting, from the second sensor data, line lengths and angles corresponding to sidewalls of the V-shaped receptacle.

24. The robot of claim 15, wherein the control system is configured to reference the first physical feature for moving the robot into the gross alignment position and reference the second physical feature for moving the robot from the gross alignment position and into the fine-alignment position, and wherein the second physical feature is the complementary mating feature of the cart.

25. The robot of claim 24, wherein the control system is configured to detect the second physical feature via the second sensor data by determining, based on the detection of the first physical feature and a known spatial relationship between the first and second physical features, a location where the second physical feature is expected to be detected, and determining that the portion of the second sensor data corresponding to the expected location is characteristic of the second physical feature.

26. The robot of claim 15, wherein the control system is configured to maneuver the robot into the fine-alignment position with respect to the cart by advancing the robot toward the cart from the gross alignment position, based on a distance computed as a function of the relative distances determined for the second physical feature, and terminate the advance responsive to a proximity sensor associated with the mating feature of the robot being triggered by a sensor actuator associated with the complementary mating feature of the cart.

27. The robot of claim 15, wherein the control system is configured to latch the robot to the cart after the robot reaches the fine-alignment position by activating a motorized latch of the robot responsive to the proximity sensor being triggered, the motorized latch being configured to releasably hook to the cart and exert a pulling force on the cart that retains the mating feature of the cart in engagement with the complementary mating feature of the robot.

28. The robot of claim 15, wherein the control system is configured to latch the robot to the cart after the robot reaches the fine-alignment position based on exerting a pulling force on the cart via a motorized latch of the robot, said pulling force urging the mating feature of the robot into engagement with the complementary mating feature of the cart and thereby actuating a brake release mechanism of the cart.

* * * * *